United States Patent
Misawa

(10) Patent No.: US 8,405,752 B2
(45) Date of Patent: Mar. 26, 2013

(54) IMAGE TAKING APPARATUS

(75) Inventor: Atsushi Misawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 215 days.

(21) Appl. No.: 12/885,130

(22) Filed: Sep. 17, 2010

(65) Prior Publication Data

US 2011/0001801 A1   Jan. 6, 2011

Related U.S. Application Data

(62) Division of application No. 12/155,360, filed on Jun. 3, 2008, now Pat. No. 8,094,228.

(30) Foreign Application Priority Data

Jun. 6, 2007   (JP) .................................. 2007-150652
Jul. 4, 2007   (JP) .................................. 2007-176586

(51) Int. Cl.
*H04N 5/222* (2006.01)

(52) U.S. Cl. .............. 348/333.01; 348/333.02; 348/373; 348/333.08; 348/333.11

(58) Field of Classification Search ................ 348/222.1, 348/333.01, 333.08, 333.11, 373–376; 345/1.1, 345/1.3, 5
See application file for complete search history.

(56) References Cited

U.S. PATENT DOCUMENTS

| | | | |
|---|---|---|---|
| 4,303,948 A | 12/1981 | Arai et al. | |
| 7,430,008 B2 | 9/2008 | Ambiru et al. | |
| 2003/0137493 A1 | 7/2003 | Chuang | |
| 2004/0221244 A1 | 11/2004 | Baldino | |
| 2005/0227762 A1 | 10/2005 | Tahara et al. | |
| 2007/0019942 A1 | 1/2007 | Kurosawa | |
| 2009/0082107 A1 | 3/2009 | Tahara et al. | |

FOREIGN PATENT DOCUMENTS

| | | | |
|---|---|---|---|
| JO | 11-297152 A | | 10/1999 |
| JP | 04-014086 A | | 1/1992 |
| JP | 11-146317 A | | 5/1999 |
| JP | 11297152 A | * | 10/1999 |
| JP | 2003-302685 A | | 10/2003 |
| JP | 2004-064205 A | | 2/2004 |
| JP | 2004-347897 A | | 12/2004 |
| JP | 2005-198068 A | | 7/2005 |
| JP | 2005-204720 A | | 8/2005 |
| JP | 2006-310944 | | 11/2006 |
| JP | 2006-325008 A | | 11/2006 |
| JP | 2006-344168 | | 12/2006 |
| JP | 2007-36492 | | 2/2007 |

OTHER PUBLICATIONS

Office Action in U.S. Appl. No. 12/155,360, dated Nov. 24, 2010.
Notice of Reasons for Rejection dated Jun. 6, 2011 (with an English translation).
Notice of Reasons for Rejection dated Jul. 4, 2011 (with an English translation).
Notice of Allowance dated Sep. 9, 2011 (U.S. Appl. No. 12/155,360).

* cited by examiner

*Primary Examiner* — Yogesh Aggarwal
(74) *Attorney, Agent, or Firm* — McGinn IP Law Group, PLLC

(57) ABSTRACT

An electronic device includes a three-dimensional display device having a two-dimensionally arranged plurality of three-dimensional display elements each including a rod and an actuator which causes the rod to move vertically, a storage device which has a three-dimensional form of a desired switch stored therein, and a three-dimensional display control device which separately controls heights of the rods via the actuators of the plurality of three-dimensional display elements based on the three-dimensional form of the switch stored in the storage device and deforms an upper surface of the three-dimensional display device to match the three-dimensional form of the switch.

20 Claims, 33 Drawing Sheets

IMAGE TAKING APPARATUS

The present Application is a Divisional Application of U.S. patent application Ser. No. 12/155,360, filed on Jun. 3, 2008, now U.S. Pat. No. 8,094,228 and claims benefit of priority from Japanese Patent Application No. 2007-150652, filed on Jun. 6, 2007, and from Japanese Patent Application No. 2007-176586, filed on Jul. 4, 2007, the entire contents of which are incorporated herein by reference.

BACKGROUND OF THE INVENTION

1. Field of the Invention

The present invention relates to an image taking apparatus and, in particular, to an image taking apparatus which allows customization of a design and arrangement of an operations device.

2. Description of the Related Art

The following are examples of devices which have been proposed to allow customization of design and arrangement of an operation portion by freely arranging switches on a touch panel, by changing a shape of a sensing region using a touch panel divided into blocks over a screen, and the like.

Japanese Patent Application Laid-Open No. 2006-310944 describes a technology in which it is possible to record a portion of captured images as an icon.

Japanese Patent Application Laid-Open No. 2006-344168 describes a technology in which it is possible to freely arrange switches on a touch panel.

Japanese Patent Application Laid-Open No. 2007-36492 describes a technology in which it is possible to freely arrange switches on an LCD so as to match elastically deforming switches.

SUMMARY OF THE INVENTION

However, the technology described in Japanese Patent Application Laid-Open No. 2006-310944 has a problem in that, because the portion extracted from the captured image is simply recorded as an icon and the form of the switch cannot be freely altered, it is not possible to change the operability.

The technology described in Japanese Patent Application Laid-Open No. 2006-344168 has a problem in that, because the switch is selected from among standard forms and arrangements, it is not possible to change the position and form of the switch.

The technology described in Japanese Patent Application Laid-Open No. 2007-36492 has a problem in that the change to the position and form of the switch are limited. A further problem is that, because a detection range is fixed even when the size and form of the switch have been changed, the operability of the switch remains unchanged.

A further problem is that when a GUI which makes use of paint functions from, for instance, games console or personal computer software is adopted, the small size of the liquid crystal display provided in digital camera makes it extremely inconvenient to design switch or lever shapes on screen. Another problem is that, even when it is possible to customize the appearance of an operations device or the like, further work is required to a match a detection range and a detection location with an image.

The present invention has been conceived after considering the above-described circumstances with the object of improving operability by enabling simpler customization of an operations device, such as a release button, through matching of the design and arrangement of the operations device with finger size and length.

The image taking apparatus of a first aspect of the present invention comprises a display device provided on at least one surface of an apparatus body; a touch panel of a substantially same shape as the display device and provided on a front surface of the display device; an image capture device which acquires an image of a subject; an extraction device which extracts, from the image acquired by the image capture device, a switch image that is included in the acquired image; a display control device which causes the display device to display the switch image extracted by the extraction device; a detection device which detects inputs to the touch panel, and detects an input to a region overlaying a region at which the switch image is displayed by display control device; and a control device which, when the input is detected by the detection device, executes a predetermined operation that has been set in advance for a switch represented by the switch image.

According to the image taking apparatus of the first aspect, the switch image included in the acquired image of the subject is extracted and displayed on the display device. The touch panel is provided on the front surface of the display device and, when the input to the region which overlays the region displaying the switch image is detected, the predetermined operation set in advance for the same switch image is performed. Since the operations device (such as a release button) can thereby be given the shape and appearance of a desired image, it is possible to customize the operations device to a desired design.

The image taking apparatus of a second aspect of the present invention is the image taking apparatus according to the first aspect, further comprising: an input device which inputs at least one of a position and a size of the switch image to be displayed on the display device, wherein the display control device both causes the display device to display the switch image using a standard size and position and causes a change in at least one of the position and size of the switch image in response to the input from the input device.

According to the image taking apparatus of the second aspect, at least one of the position and the size is inputted, and the switch image displayed on the display device with standard size and position is changed based on the inputted position and size. Hence, it is possible to freely customize the position and shape of the operations device to match finger width, finger length, and the like.

The image taking apparatus of a third aspect of the present invention is the image taking apparatus according to the first or second aspect, further comprising a storage device built into the apparatus body, wherein the storage device stores the switch image extracted by the extraction device, and information of at least one of a position, a size, and a display region of the switch image displayed on the display device by the display control device.

According to the image taking apparatus of the third aspect, the switch image and information of at least one of the position, the size, and the display region are stored in the storage device built into the apparatus body. Hence, it is possible to record the operation portion which has been freely customized. Moreover, since the operation portion is recorded in the built-in memory of the device, the recorded data is never lost when the removable memory is changed.

The image taking apparatus of a fourth aspect of the present invention is the image taking apparatus according to any of the first to third aspects, wherein the display device is constituted by a two-dimensionally arranged plurality of pixels in a two-dimensional arrangement, and the touch panel is constituted by a two-dimensionally arranged plurality of detection blocks which is fewer in number than the plurality of pixels.

The image taking apparatus of a fifth aspect of the present invention is the image taking apparatus according to the fourth aspect, wherein the extraction device includes: a second display control device which displays on the display device the image acquired by the image capture device, a second detection device which detects an input to the touch panel, a first coordinate calculation device which calculates coordinates of the detection blocks at which the input has been detected by the second detection device, and a second extraction device which, when a substantially closed region has been detected by the second detection device, extracts pixels in a region enclosed by the detection blocks having the coordinates calculated by the first coordinate calculation device, as the switch image.

According to the image taking apparatus of the fifth aspect, the coordinates of the position of the detection blocks at which the input has been detected are calculated, and the pixels in the regions enclosed by the detection blocks of the calculated coordinates are extracted as the switch image. Hence, the image desired by the user can be used as the operations device.

The image taking apparatus of a sixth aspect of the present invention is the image taking apparatus according to the fourth or fifth aspect, further comprising a second coordinate calculation device which calculates coordinates of the detection blocks corresponding to the coordinates of the pixels of the switch image displayed on the display device, wherein the detection device detects an input to the detection blocks provided at the coordinates calculated by the second coordinate calculation device.

According to the image taking apparatus of the sixth aspect of the present invention, the detection block coordinates corresponding to the coordinates of the switch image pixels displayed on the display unit are calculated, and the input at the detection blocks provided at the calculated coordinates is detected. Hence, it is possible to use the displayed image as the operations device.

The image taking apparatus of a seventh aspect of the present invention is the image taking apparatus according to any of the first to sixth aspects, wherein the display devices is multiply provided on at least one of the upper surface and the rear surface, and the display control device selects, from the plurality of display devices, a display device to display a desired region, and causes the selected display device to display the desired region.

According to the image taking apparatus of the seventh aspect, the display device is selected from a plurality of display devices, and the selected display device displays the desired region. Hence, it is possible to freely customize the position and shape of the operations device.

The electronic device of an eighth aspect of the present invention is an electronic device comprising: a three-dimensional display device having a two-dimensionally arranged plurality of three-dimensional display elements each including a rod and an actuator which causes the rod to move vertically; a storage device which has a desired three-dimensional switch form stored therein; and a three-dimensional display control device which separately controls heights of the rods via the actuators of the plurality of three-dimensional display elements based on the three-dimensional switch form stored in the storage device and deforms an upper surface of the three-dimensional display device to match the three-dimensional switch form.

According to the electronic device of the eighth aspect, the upper surface of the three-dimensional display device is deformed to match the three-dimensional form of the switch by separately controlling the height of each rod via the corresponding actuator. Hence, it is possible to display the switch three-dimensionally.

The electronic device of a ninth aspect of the present invention is the electronic device according to the eighth aspect, further comprising: an image capture device which acquires an image of a subject; an extraction device which extracts, from the image acquired by the image capture device, a switch image that is included in the acquired image; and a form detection device which detects a three-dimensional form of a switch represented by the switch image based on the switch image extracted by the extraction device, wherein the storage device stores the three-dimensional switch form detected by the form detection device as the desired three-dimensional switch form.

According to the electronic device of the ninth aspect, the three-dimensional switch form detected based on the switch image included in the acquired image is stored and displayed on the three-dimensional display device. Hence, the image desired by the user can be used as the operations device. Moreover, since the switch can be set to a desired form and operation feeling, it is possible to customize the switch as desired. It is also possible to freely customize the position and form of the switch to match finger thickness, finger length, and the like. Furthermore, it is possible to record the freely customized switch.

The electronic device of a tenth aspect of the present invention is the image electronic device according to the ninth aspect, wherein the storage device includes a first recording device having recorded therein a three-dimensional switch form for use in initial setting, and a second recording device having recorded thereon the three-dimensional switch form detected by the form detection device, and the three-dimensional display control device, when the three-dimensional switch form has been recorded in the second recording device, deforms the upper surface of the three-dimensional display device to match the three-dimensional switch form recorded in the second recording device, and when the three-dimensional switch forms has not been recorded in the second recording device, deforms the upper surface of the three-dimensional display device to match the switch three dimensional form stored in the first recording device.

According to the electronic device of the tenth aspect, when the three-dimensional switch form has been detected from the acquired image and recorded, the recorded switch is displayed on the three-dimensional display device, and imaging is performed using the displayed switch. When the three-dimensional switch form has not been recorded, which is to say when the image that forms the basis for the switch has not been captured, the switch of the initial settings which has been recorded in advance is displayed on the three-dimensional display device, and imaging is performed using the displayed switch. Hence, when a freely customized switch has been recorded, it is possible to make use of the customized switch.

The electronic device of an eleventh aspect of the present invention is the electronic device according to the ninth or tenth aspect, wherein the form detection device detects the switch three dimensional form based on the extracted switch image.

According to the electronic device of the eleventh aspect, the three-dimensional switch form is detected using the extracted switch image. Hence, it is possible to automatically detect the three-dimensional switch form or the like from the acquired image, and the operations device can be customized easily, without a great deal of work.

The electronic device of a twelfth aspect of the present invention is the electronic device according to the ninth or tenth aspects, wherein the form detection device divides the extracted switch image to form a plurality of regions, measures a distance to the switch for each of the plurality regions, and detects the three-dimensional switch form based on the measured distances.

According to the electronic device of the twelfth aspect, the extracted switch image is divided into a plurality of regions, and a three-dimensional switch form is detected from the result of measuring the distance to the subject for each of the plurality of regions. Hence, it is possible to automatically detect the three-dimensional switch form or the like from the acquired image, and the switch can be customized easily, without a great deal of work.

The electronic device of a thirteenth aspect of the present invention is the electronic device according to any of the eighth to twelfth aspects, further comprising: a flexible display device which is provided on the upper surface of the three-dimensional display device and deforms to match a form of the upper surface of the three-dimensional display device; a storage device having stored therein a switch image of a desired switch; and a display control device which causes the flexible display device to display the switch image stored on the storage device, wherein the display control device causes the flexible display device to display the switch image so as to overlay the three-dimensional switch form displayed on the three-dimensional display device.

According to the electronic device of the thirteenth aspect, the switch image is displayed on the flexible display device so as to overlay the three-dimensional switch form displayed on the three-dimensional display device. Hence, it is possible to use the desired image as the switch. Moreover, it is possible to customize the appearance as well as the form of the switch.

The electronic device of a fourteenth aspect of the present invention is the electronic device according to any of the eighth to thirteenth aspects, further comprising: a pressing force detection device which detects pressing forces to the three-dimensional display device, and detects the pressing force to the three-dimensional display elements provided in a region at which the switch is displayed by the three-dimensional display control device; and a control device which, when the pressing force is detected by the pressing force detection device, executes a predetermined operation that has been set in advance for the switch.

According to the electronic device of the fourteenth aspect, when input is detected to the region of the three-dimensional display device at which the operations device is displayed, the predetermined operation set in advance for the same operations device is performed. Hence, it is possible to use the switch displayed on the three-dimensional display device as the operations device. Moreover, it is possible to have the three-dimensional display device work as a display device and a detection device, and thus to simplify the image taking apparatus.

The electronic device of a fifteenth aspect of the present invention is the electronic device according to the fourteenth aspect, further comprising an operation setting device which sets an operation to be executed by the control device for the pressing force detected by the pressing force detection device, wherein the pressing force detection device detects a plurality of pressing forces of differing strengths to the three-dimensional display elements, and the operation setting device sets a different operation for each of the plurality of pressing forces of differing strengths.

According to the fifteenth aspect of the electronic device, differing operations are set to be performed in response to the pressing forces detected by the three-dimensional display elements. Hence, by detecting the strength (magnitude, stroke distribution, range, and the like) of the pressing force applied to the three-dimensional display elements and setting differing operations accordingly, it is possible to reproduce the feel of switch-type operations in existing cameras, and therefore to provide users who place a high value on operability with an unconventional camera having settings functions with a high-level of operability.

The electronic device of a sixteenth aspect of the present invention is the electronic device according to any of the eighth to thirteenth aspects, further comprising: a touch panel of a substantially same form as the three-dimensional display device provided on the upper surface of one of the three-dimensional display device and the flexible display device; an input detection device which detects inputs to the touch panel and detects the input to a region overlaying a region at which the switch is displayed by the three-dimensional display control device; and a control device which, when the input is detected by the input detection device, executes a predetermined operation that has been set in advance for the switch.

According to the electronic device of the sixteenth aspect, when input to the region, which is of the touch panel provided on the upper surface of the three-dimensional display device and overlays the region at which the switch is displayed on the three-dimensional display device, is detected, the predetermined operation set in advance for the same switch is performed. Hence, it is possible to use the switch displayed on the three-dimensional display device as the operations device.

The electronic device of a seventeenth aspect of the present invention is the electronic device according to any of the eighth to sixteenth aspects, wherein the storage device is built into a device body and stores information of at least one of a position, a size, and a display region of the switch displayed on the three-dimensional display device by the three-dimensional display control device.

According to the electronic device of the seventeenth aspect, the desired operations device is recorded by storing, in the storage device built into a device body, information of at least one of position at which the switch is displayed, the size of the displayed switch, and the display region. Hence, since the switches are recorded in the memory built into the device, the recorded data is not lost when the removable memory is changed, and the recorded switch can be used at any time.

The present invention enables an improvement in operability by enabling simple customization to match the design and arrangement of the operation portion, such as the release button, with finger size and length.

DETAILED DESCRIPTION OF THE PREFERRED EMBODIMENTS

The following is a detailed description of the preferred embodiments of a digital camera of the present invention, with reference to the accompanying drawings.

First Embodiment

Figure 1:
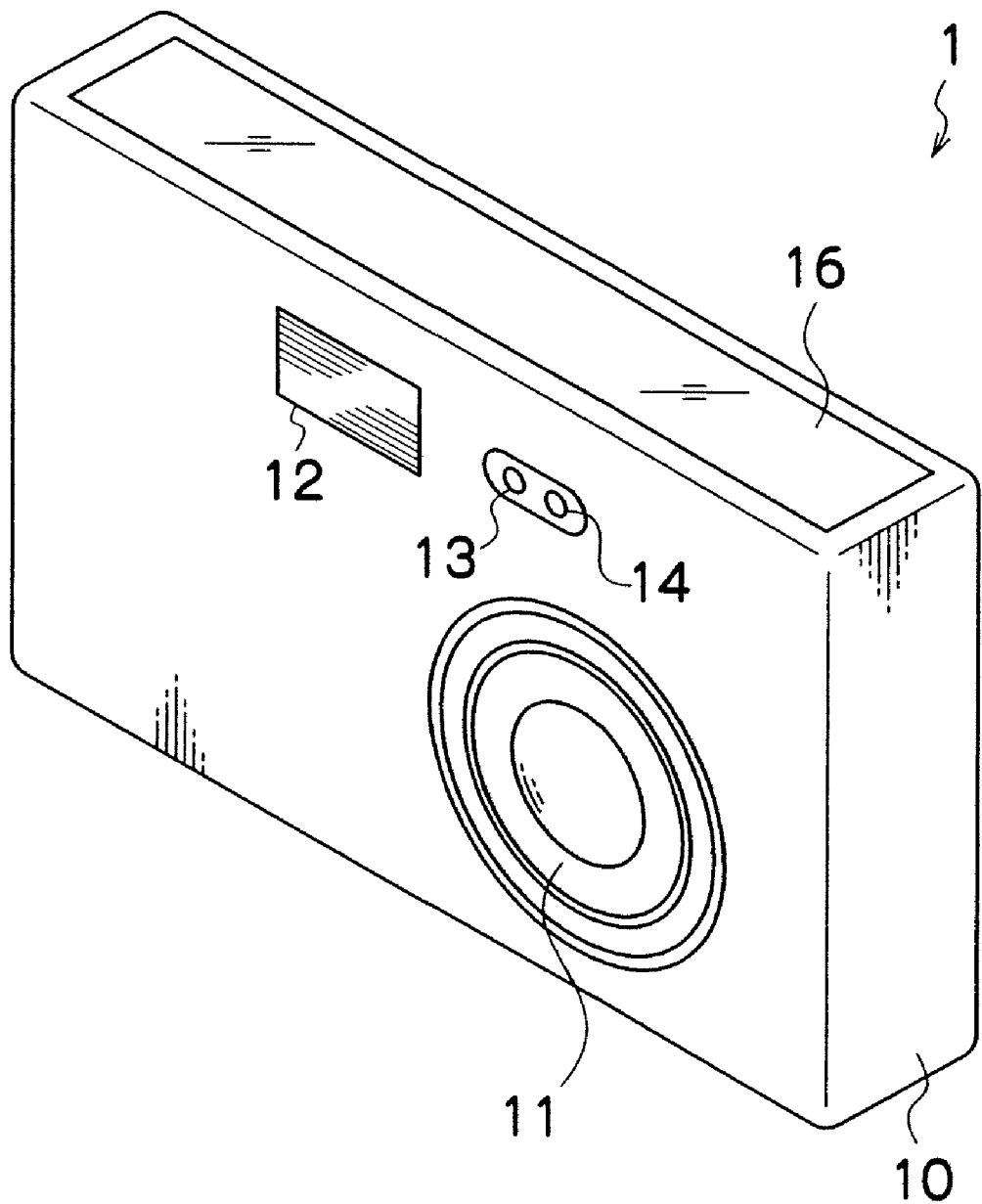
FIG. 1 is a front perspective view of a digital camera 1 of the present invention.
Figure 2:
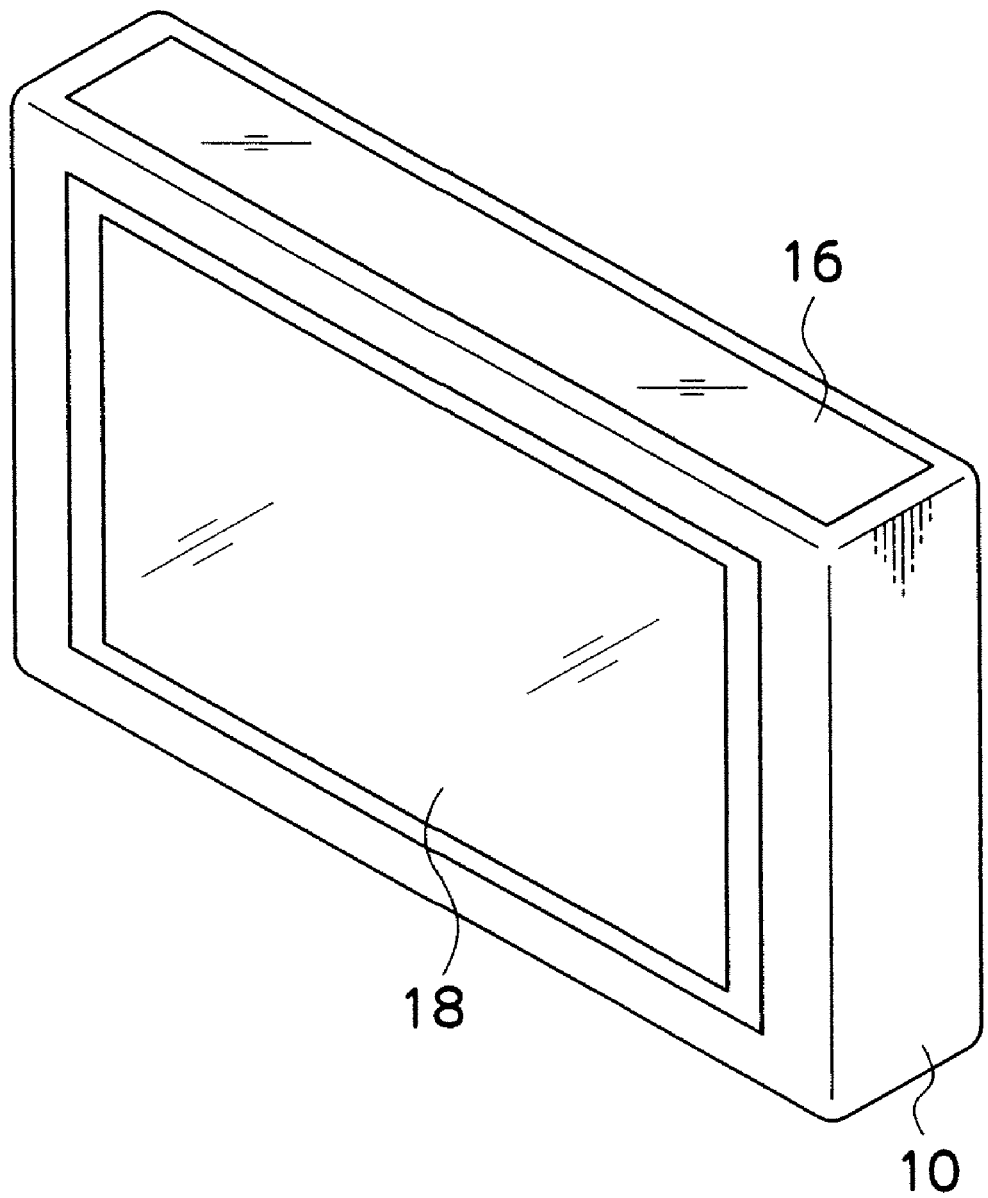
FIG. 2 is a rear perspective view of the digital camera 1.

FIG. 1 is a front perspective view showing a digital camera 1 of the first embodiment 1, and FIG. 2 is a rear perspective view showing the first embodiment of the digital camera 1. The digital camera 1 receives, using image sensors, light which has passed through a lens, converts the light to digital signals, and records the digital signals in a storage medium.

A camera body 10 of the digital camera 1 is formed as a four-cornered box with oblong sides. A lens 11, a flash 12, an AF auxiliary light lamp 13, a flash adjustment sensor 14, and the like are provided on a front surface of the camera body 10 as shown in FIG. 1. An operation displaying LCD 15, and a touch panel 16 are provided on an upper surface of the camera body 10. Further, a display unit 17 and a touch panel 18 are provided on a rear surface of the camera body 10, as shown in FIG. 2. Note that a threaded tripod hole and an openable cover that covers a battery insertion part and a memory card slot are provided on a lower surface on the camera body 10 not shown in the drawings, and a battery 19 and a memory card 20 are installed in the battery insertion part and the memory card slot respectively.

The lens 11 has a retractable zoom-lens construction, and is caused to project from the camera body 10 by setting a mode of the camera to an imaging mode using a mode switch. Note that the zoom mechanism and retraction mechanism of the lens 11 are well-known technologies and specific descriptions of the constructions of these components are therefore omitted from the following.

The flash 12 is constructed from a xenon tube as a light source and a parabolic reflector which enable light from the flash to be irradiated towards a principle subject.

The AF auxiliary light lamp 13 is constructed from a high-intensity LED or the like and emits light when necessary during autofocus.

The flash adjustment sensor 14 adjusts an amount of light emitted by the flash 12.

Figure 3:
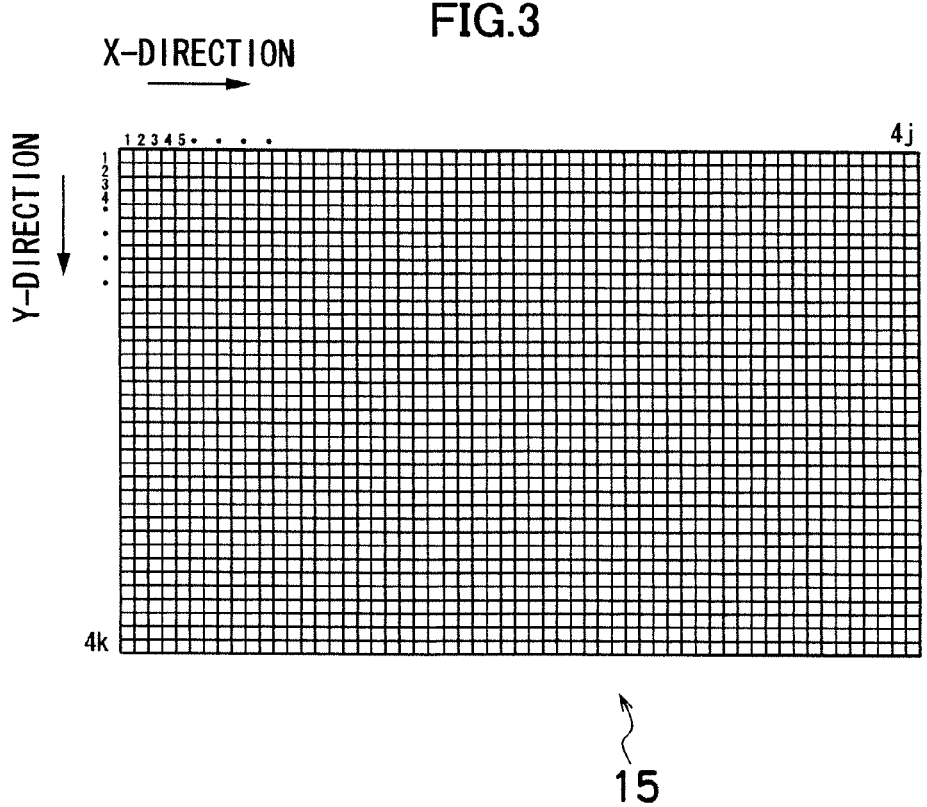
FIG. 3 shows the construction of a liquid crystal display of the digital camera 1.

The operation displaying LCD 15 is a liquid crystal display capable of color display, and includes a two-dimensional arrangement with Nj (where N and j are integers) pixels in the x-direction and Nk (where N and k are integers) pixels in the y-direction as shown in FIG. 3. The operation displaying LCD 15 displays an operation portion such as a release button, a mode switch and a mode dial, and is thereby used as a user interface display panel. Note that in the present embodiment, an example in which N is 4 is described.

Figure 4:
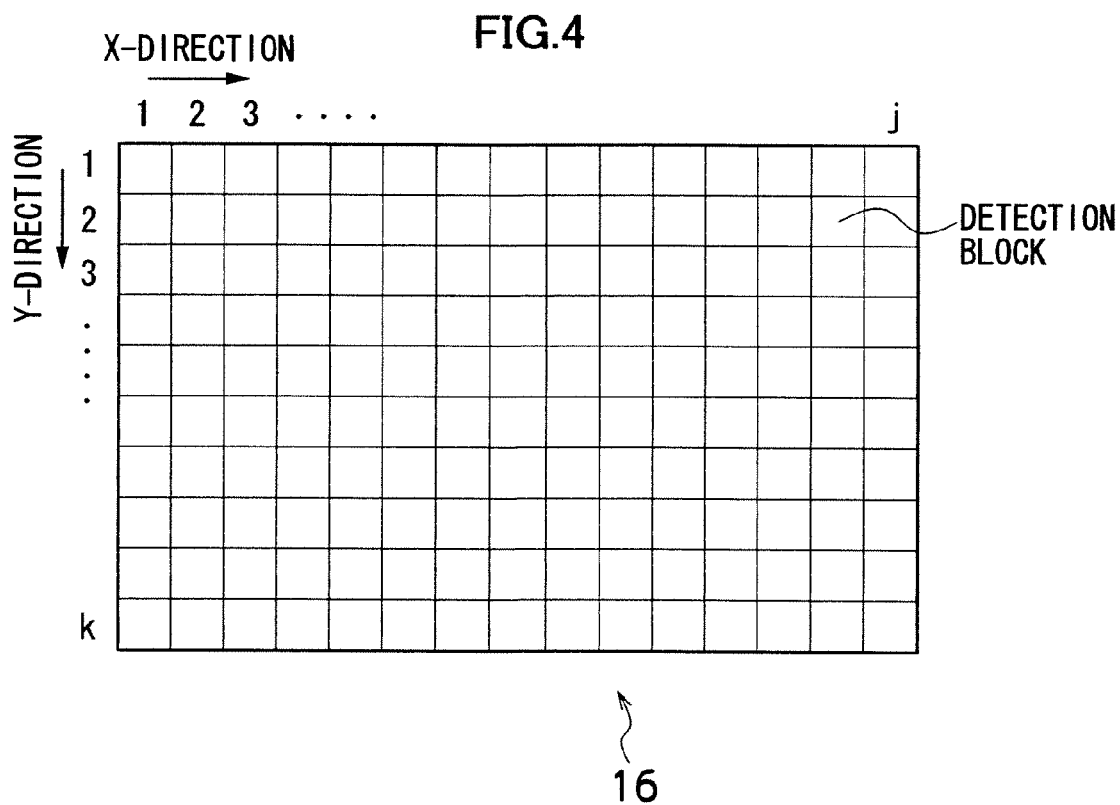
FIG. 4 shows a construction of a touch panel of the digital camera 1.
Figure 5:
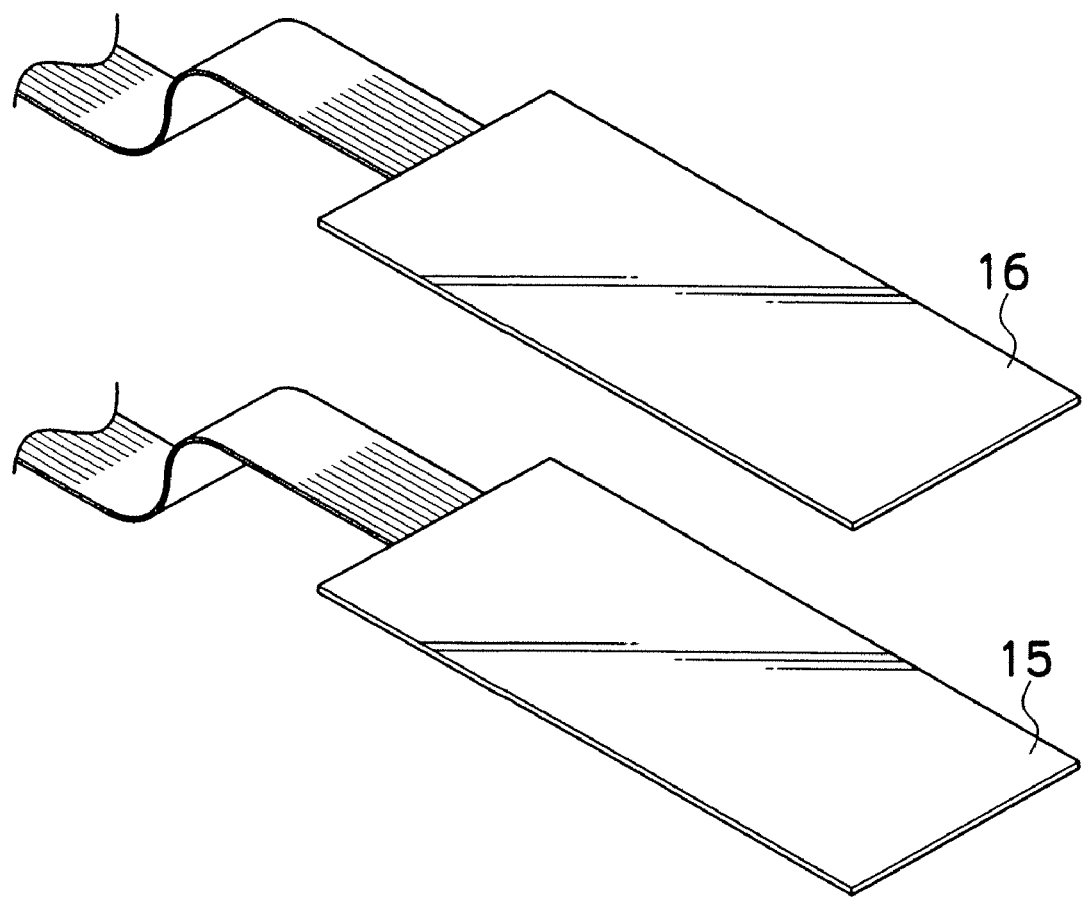
FIG. 5 illustrates an arrangement of the liquid crystal display and the touch panel in the digital camera 1.

The touch panel 16 is an analog low-resistance film type touch panel formed by bonding together members (mainly films, glass, and the like) having a transparent conductive film (ITO) formed on one side so that the transparent conductive films face each other with a predetermined gap therebetween. When pressed by a finger or pen, the transparent conductive films make contact, causing input of a signal. The touch panel 16 is also a two-dimensional arrangement having j (where j is an integer) detection blocks in the x-direction and k (where k is an integer) detection blocks in the y-direction as shown in FIG. 4, and is capable of detecting an input at each detection block. The touch panel 16 is provided in on a front surface of the operation displaying LCD 15, as shown in FIG. 5. The detection blocks of the touch panel 16 have a 1-to-4 correspondence with the pixels of the operation displaying LCD 15, and are constructed so that the relative position of a desired pixel "A" of the operation displaying LCD 15 and a detection block "a" of the touch panel 16 are found by performing a calculation of the type shown in Equation 1.

$$a = A \times (\tfrac{1}{4}) \qquad \text{[Equation 1]}$$

The display unit 17 is a liquid crystal display capable of color display, and, in the same way as the operation displaying LCD 15, is a two-dimensional arrangement with Nh (where N and h are integers) pixels in the x-direction and Ni (where N and i are integers) pixels in the y-direction. The display unit 17 is used as an image display panel for displaying captured images during playback mode and as a user interface display panel by displaying an operation portion such as a mode dial, display/go back button, a zoom button, a cross button, a MENU/OK button, a DISP button, and a BACK button or the like. In the imaging mode, a through image is displayed as required and an electronic finder for confirming an angle of view is used. Note that in the present embodiment an example in which N is 4 is described.

The touch panel 18 is provided on a front surface of the display unit 17 and, like the touch panel 16, is an analog low-resistance film type touch panel with a two-dimensional arrangement having h (where h is an integer) detection blocks in the x-direction and i (where i is an integer) detection blocks in the y-direction, and allows detection by each detection block. The detection blocks of the touch panel 18 have a 1-to-4 correspondence with the pixels of the display unit 17, and are constructed so that the relative position of a desired pixel "B" of the display unit 17 and a detection block "b" of the touch panel 18 are found by performing a calculation of the type shown in Equation 2.

$$b = B \times (1/4)$$ [Equation 2]

The following describes the operations device. An original switch image is recorded in advance as the operations device, and the original switch image is used when the user does not record a desired image for use as the operations device. When an input is detected, using a later-described method, by a detection block corresponding to the pixels displaying one of the operation portion, a predetermined operation corresponding to the same operations device is performed. The predetermined operations are described below. Note that the details of methods for recording the operation portion and methods for using the recorded operation portion are described later.

The release button is formed using two-stage stroke-type switch having a so-called "half-push" stage and a "full-push" stage. The digital camera 1 is caused to execute AE/AF operation by a "half-push" of the release button, and to execute imaging by a "full-push".

The mode switch is a switch for setting a mode of the digital camera 1, and is provided to be slidable between a "playback position" and an "imaging position". The digital camera 1 is set to a "playback mode" by sliding the mode switch to the "playback position" and to an "imaging mode" by sliding the mode switch to the "imaging position".

The mode dial functions as an imaging mode setting device for setting the imaging mode of the digital camera 1, and various imaging modes of the digital camera 1 are set by positioning the mode dial. For instance, an "auto imaging mode" in which aperture, shutter speed, and the like are automatically set by the digital camera 1, a "movie capture mode" for capturing moving images, a "people imaging mode" for imaging human beings, a "sports imaging mode" for imaging moving bodies, a "view capture mode" for imaging landscapes, a "night imaging mode" for imaging evening and night views, an "aperture priority imaging mode" in which the aperture is set by the user and the shutter speed is set automatically by the digital camera 1, a "shutter speed priority imaging mode" in which the shutter speed is set by the user and the aperture is set automatically by the digital camera 1, a "manual imaging mode" in which the aperture, the shutter speed and the like are set by the user, and a "switch imaging mode" (described in detail in a later section) for capturing images to be recorded as an operation portion.

The mode dial is used to call up various setting screens for the imaging and playback functions. When the mode dial is pressed during imaging, setting screens for an image size (number of recorded pixels), sensitivity and the like are displayed on the display unit 17. When the mode dial is pressed during playback, image deletion, and print scheduling (DPOF) setting screens and the like are displayed.

The display/go back button is used as a switching instruction (display function) to switch between display content on the display unit 17 and as an instruction (go back function) for cancelling an input operation and the like. In other words, the functions assigned to the display/go back button vary based on a state of the settings of the digital camera 1.

The zoom button functions as a zoom instruction device for instructing zooming and is composed of a zoom tele button for instructions to zoom in towards a tele-side and a zoom wide button for instructions to zoom out towards a wide-angle side. In the imaging mode, a focal length of the lens 11 of the digital camera 1 is changed by operations performed on the zoom tele button and the zoom wide button. Further, in playback mode, the image being played back is expanded and contracted by performing operations using the zoom tele button and the zoom wide button.

The cross button functions as a direction instructing device for inputting instructions relating to the four directions of up, down, left and right, and is used, for instance, to make selections of menu items on a menu screen.

The MENU/OK button functions as a button (MENU button) for issuing instructions to switch from normal screens of each mode to a menu screen, and functions as a button (OK button) for issuing instructions to decide upon an option, perform processing, or the like.

The DISP button functions as a button for issuing instructions to switch between displays on the display unit 17. When the DISP button is pressed during imaging, the display on the display unit 17 is switched from ON to a framing guide display, and from framing guide display to OFF. Further, when the DISP button is pressed during playback, the display unit is switched from normal playback to playback without character display, and from playback without character display to multi-playback.

The BACK button functions as a button for issuing instructions to cancel an input instruction, return to an immediately preceding operating state, or the like.

Figure 6:
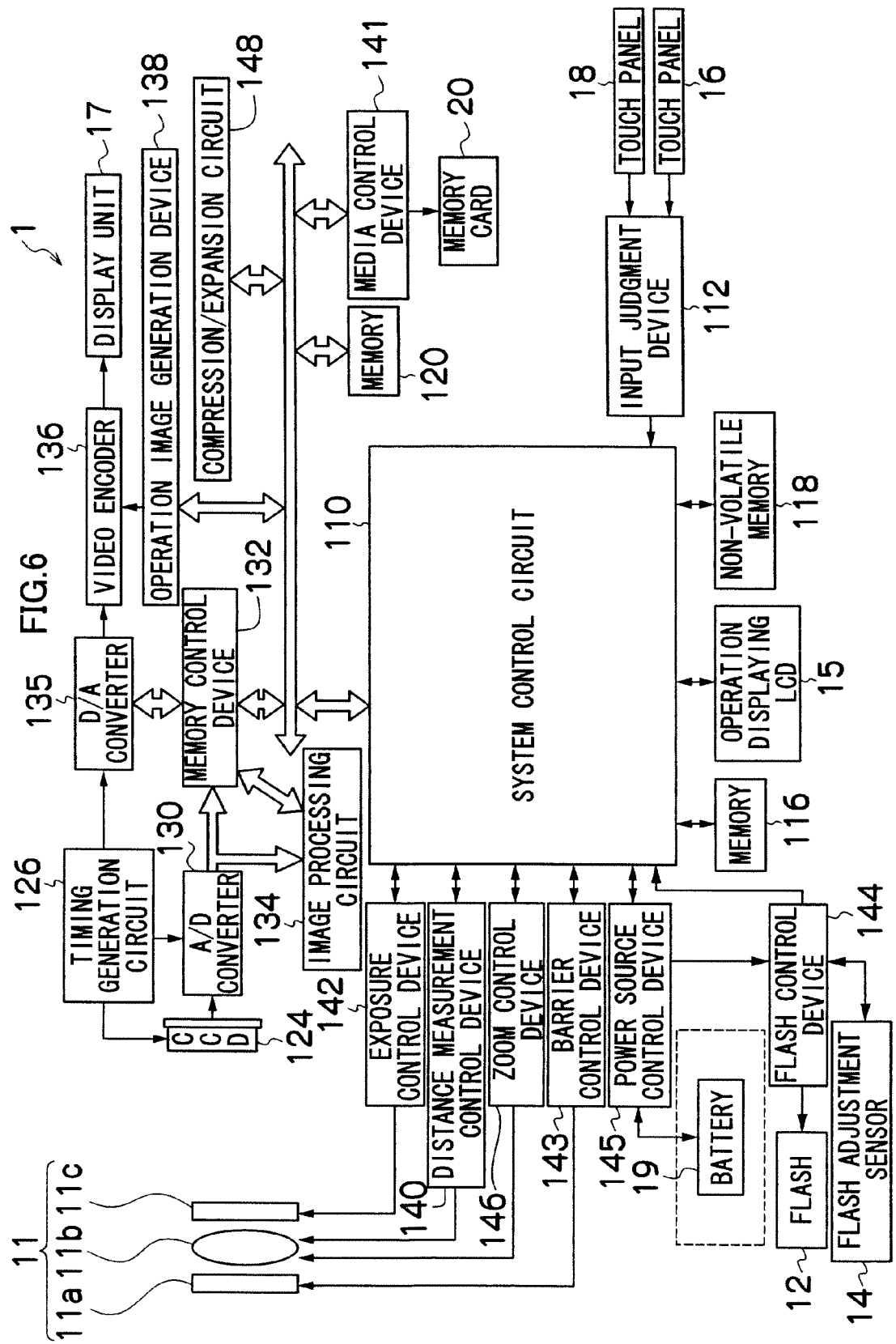
FIG. 6 is a block diagram showing an electrical construction of the digital camera 1.

The following describes an electrical construction of the digital camera 1. FIG. 6 is a block diagram showing the electrical construction of the digital camera 1.

As shown in FIG. 6, the digital camera 1 includes a system control circuit 110, an input judgment device 112, a memory 116, a non-volatile memory 118, a memory 120, an image sensor 124, a timing generation circuit (TG) 126, an A/D converter 130, a memory control device 132, an image processing circuit 134, a video encoder 136, an operation image generation device 138, a distance measurement control device (AF device) 140, an exposure control device (AE device) 142, a barrier control device 143, a zoom control device 146, a compression/expansion circuit 148, a media control device 150, a flash control device 160, and the like.

The system control circuit 110 controls, based on operation signals inputted from the input judgment device 112, the entire digital camera 1 in an integrated manner in accordance with a predetermined control program.

The input judgment device 112 detects input from the touch panels 16 and 18. The input judgment device 112 finds the pixels of the operation displaying LCD 15 associated with the detection blocks in the touch panel 16 at which an input has been detected, and outputs the result of the input to the system control circuit 110. Further, the input judgment device 112 finds the pixels of the display unit 17 associated with the detection blocks in the touch panel 18 at which an input has been detected, and outputs the result to the system control circuit 110. When the input of the detection block corresponding to pixels displaying an operations device is detected by the input judgment device 112, the system control circuit 110 performs a predetermined operation corresponding to the operations device.

The memory 116 is used to store control programs to be executed by the system control circuit 110, various types of data necessary for the control, and the like.

The non-volatile memory 118 has stored therein various settings information relating to operations of the digital camera 1, such as user settings information and the like.

The memory (SDRAM) 120 is used as a calculation work region of the system control circuit 110 and as a temporary storage region for image data and the like.

The image sensor 124 is constructed from a color CCD having a predetermined color filter arrangement, and electronically captures images of the subject imaged by the lens 11. The timing generation circuit (TG) 126 outputs timing signals for driving the image sensor 124 according to instructions from the system control circuit 110.

The A/D converter 130 samples (correlated double sampling processing) the R, G, and B signals from each pixel for image signals outputted from the image sensor 124, converts amplified R, G, and B signals to digital R, G, and B signals, and outputs the results.

The memory control device 132 outputs the digital R, G, and B signals outputted from the A/D converter 130 to the memory 120.

The image processing circuit 134 includes a synchronization circuit (a processing circuit which compensates for the spatial differences in the color signals in a single-chip CCD color filter arrangement), a white balance compensation circuit, a gamma compensation circuit, an outline compensation circuit, a brightness/color difference signal generation circuit and the like. The image processing circuit 134 performs required signal processing on the inputted image signals in accordance with instructions from the system control circuit 110, and generates image data (YUV data) composed of brightness data (Y data) and color difference data (Cr and Cb data).

The D/A converter 135 converts image signals processed by the image processing circuit 134 to analog signals, and supplies the analog signals to the video encoder 136.

The video encoder 136 controls the display to the display unit 17 in accordance with instructions from the system control circuit 110. In other words, the video encoder 136 converts image signals inputted from the D/A converter 135 or the operation image generation device 138 to a video signal (such as an NTSC signal, a PAL signal, or a SCAM signal) for displaying on the display unit 17, and outputs the video signal to the display unit 17.

The operation image generation device 138 creates images for use as an operation portion based on images acquired by the image sensor 124. Note that details of the operation image generation device 138 are described later.

The distance measurement control device (AF device) 140 is constructed from a high-pass filter which passes only high frequency components of the G signal, an absolute value conversion processing unit, an AF area detection device which finds a signal from within a predetermined focus area (such as a central portion of the screen), and a calculation device for calculating absolute data values within the AF area.

The exposure control device (AE device) 142 calculates physical quantities required for AE control and AWB control from the inputted image signals in accordance with instructions from the system control circuit 110. For instance, to fine a physical quantity required in the AE control, the exposure control device (AE device) 142 divides a single screen into a plurality of areas (16×16, for instance), and calculates the R, G and B image signal for each of the areas resulting from the division.

When a power switch is pressed, the barrier control device 143 opens a lens barrier 11a which is provided at a front surface of a lens 11b to protect the lens 11b, and thereby exposes a front surface of the lens 11b.

To suppress battery power consumption, the power source control device 145 supplies power from the battery 19 to all the blocks when the digital camera 1 is switched on, but only from the battery 19 to the system control circuit 110 when the digital camera 1 is not switched on.

The zoom control device 146 controls the lens 11b according to instructions from the system control circuit 110.

The compression/expansion circuit 148 performs compression processing using a predetermined method on inputted image data in accordance with instructions from the system control circuit 110, thereby generating compressed image data. Further, the compression/expansion circuit 148 performs expansion processing using a predetermined method on inputted compressed image data in accordance with instructions from the system control circuit 110, thereby generating decompressed image data.

The media control device 141 controls the reading and writing of data to and from the memory card 20 installed in the media slot in accordance with instructions from the system control circuit 110.

A flash control device 144 controls emission of light from the flash 12 in accordance with instructions from the system control circuit 110.

The following describes operations of the digital camera 1 of the present embodiment constructed in the manner described above.

First, a procedure for general imaging and recording is described. As described above, when the power source in the digital camera 1 is switched ON using a power button not shown in the drawings, the original operation portions are displayed on the operation displaying LCD 15 and the display unit 17, and the various operations become operable. The lens barrier 11a is then opened, the lens 11b is projected, and the digital camera 1 is set to an imaging standby state by setting the imaging mode using the mode switch.

In the imaging mode, subject light which has passed through the lens 11b forms an image on a light-receiving surface of the image sensor 124 via an aperture 11c. The light receiving surface of the image sensor 124 has a two-dimensionally arranged plurality of photodiodes (light receiving elements) with a predetermined array structure (Bayer, G Stripe, or the like) of red (R), green (G) and blue (B) color filters formed thereon. The subject light which has passed through the lens 11 is received by the photodiodes, and converted to amounts of signal charge corresponding to the amounts of incident light.

The signal charges which have built up in the photodiodes are read off sequentially as voltage signals (image signals) corresponding to the signal charges, based on a drive pulse applied from the timing generation circuit (TG) 126, and outputted to the A/D converter 130.

The outputted analog R, G and B signals are converted to digital R, G and B signals by the A/D converter 130, and the digital R, G and B signals are outputted to the memory control device 132. The memory control device 132 outputs the digital R, G and B signals outputted from the A/D converter 130 to the memory 120.

When the captured image is to be outputted to the display unit 17, brightness/color difference signals are generated by the image processing circuit 134 using the image signals outputted from the memory control device 132 to the memory 120, and the brightness/color difference signals are transmitted to the video encoder 136 via the D/A converter 135. In the video encoder 136, the inputted brightness/color difference signals are converted to a display-use signal format (such as the color composite video signal of the NTSC method), and outputted to the display unit 17. As a result, the images captured by the image sensor 124 are displayed on the display unit 17.

The image signals from the image sensor 124 are acquired periodically, and image data in the memory 120 is periodically overwritten using brightness/color difference signals generated from the acquired image signals. The images captured by the image sensor 124 are then displayed in real time by outputting the brightness/color difference signals to the display unit 17. The user is then able to check the angle of view by looking at the image (through image) displayed in real time on the display unit 17.

When the release button is half-pushed, an S1ON signal is inputted to the system control circuit 110, and the system control circuit 110 performs AE/AF processing.

First, the image signal acquired from the image sensor 124 via the memory control device 132 is inputted to the distance measurement control device (AF device) 140 and to the exposure control device (AE device) 142.

Data resulting from calculations by the distance measurement control device (AF device) 140 are transmitted to the system control circuit 110.

The system control circuit 110 calculates focus evaluation values (AF evaluation values) from a plurality of AF detection points while moving, by controlling the zoom control device 146, a group of focusing lenses of an imaging optical system including the lens 11, and sets a focus position at a lens position corresponding to a local maximum in the evaluation values. The system control circuit 110 then controls the zoom control device 146 so that the group of focusing lenses is moved to the calculated focus position.

The system control circuit 110 detects a brightness of the subject (subject brightness) based on calculated values obtained from the exposure control device (AE device) 142, and calculates an exposure value (imaging EV) suitable for imaging. The system control circuit 110 then determines an aperture value and a shutter speed from the calculated imaging EV and a predetermined program line plot, and controls an electronic shutter and the aperture 11c of the image sensor 124 in accordance with the aperture value and the shutter speed to give a suitable exposure. The system control circuit 110 simultaneously judges whether an emission from the flash is necessary based on the detected subject brightness.

Further, during automatic adjustment of the white balance, the exposure control device (AE device) 142 calculates an average sum for each of the R, G and B signals in each area, and supplies the calculated results to the system control circuit 110. The system control circuit 110 finds R/G and B/G ratios for each area from the obtained R sum value, B sum value and G sum value, and distinguishes a type of the light source based on distributions of the R/G and B/G color spaces and the like. Then, gain values for the R, G and B signals of the white balance adjustment circuit are controlled in accordance with a white balance adjustment value suitable for the type of light source which has been distinguished, so that the ratios between the R, G and B values is approximately 1 (i.e. the ratio of the sums of the RGB values in the single screen is R:G:B$\approx$1:1:1), an thereby performs compensation on the signal of each color channel.

As described above, a half-press of the release button causes AE/AF processing to be performed. Note that the user adjusts the angle of view as necessary by operating the zoom button and causing zooming of the lens 11.

Thereafter, when the release button is fully-pushed, the S2ON signal is inputted to the system control circuit 110, and the system control circuit 110 starts imaging and recording processing. In other words, the image sensor 124 is exposed using the shutter speed and aperture value determined based on the results of the light measurements.

When at this point the flash 12 emits light, the flash 12 is caused to emit light via the flash control device 160. When an amount of light received by the flash adjustment sensor 14 reaches a predetermined amount, the flash control device 160 cuts the supply of electricity from the battery 19 via the power source control device and thereby stops the emission of light from the flash 12.

The image signal outputted from the image sensor 124 is acquired by the memory 120 via the A/D converter 130 and the memory control device 132, converted to a brightness/color difference signal in the image processing circuit 134, and stored in the memory 120.

The image data stored in the memory 120 is inputted to the compression/expansion circuit 148 and, after being compressed in accordance with a predetermined compression format (such as the JPEG format) is stored in the memory 120. Then, after being converted to an image file of a predetermined image recording format (such as the Exif format), the compressed image file is stored on the memory card 20 via media control device 150.

The image recorded on the memory card 20 in the manner described above can be played back and displayed on the display unit 17 by putting the mode switch in the playback position to set the mode of the digital camera 1 to the playback mode.

When the mode of the digital camera 1 is set to playback mode by putting the mode switch in the playback position, the system control circuit 110 outputs a command to the media control device 150, and the last image file stored on the memory card 20 is read off.

The compressed image data of the read image file is inputted to the compression/expansion circuit 148, expanded to form the non-compressed brightness/color difference signal, and then outputted to the display unit 17 via the video encoder 136. Hence, images recorded on the memory card 20 are played back (single image playback) and displayed on the display unit 17.

Frame-by-frame playback of the image is performed using right and left key operations on the cross button, the next image file being read from the memory card 20 and displayed on the display unit 17 when the right-hand key of the cross button is pressed. When the left-hand button of the cross button is pressed, a directly preceding image file is read from the memory card 20 and played back by display on the display unit 17.

While the images being played back on the display unit 17, the images stored on the memory card 20 or the memory 120 can be deleted as required. Deletion of the image is performed by pressing the mode dial when the image is being displayed on the display unit 17.

When the display/go back button is pressed during playback of a single image, indexed images created using an index image circuit (not shown) is outputted to the display unit 17 via the video encoder 136 (index image playback).

The index image playback is also called multi-playback, and is a playback method which allows captured images to be viewed in table form. Hence, the indexed images are displayed on the display unit 17.

The following describes details of the operation image generation device 138. In the operation image generation device 138, processing (switch imaging mode) to acquire the images for use in the various operation portions, processing (switch image recording processing) to record the images for use in the various operation portions, and processing (operations device recording processing) to record the various operation portion is performed. The following describes an example of the case in which a release button is recorded as an operations device.

<Switch Imaging Mode>

Figure 7:
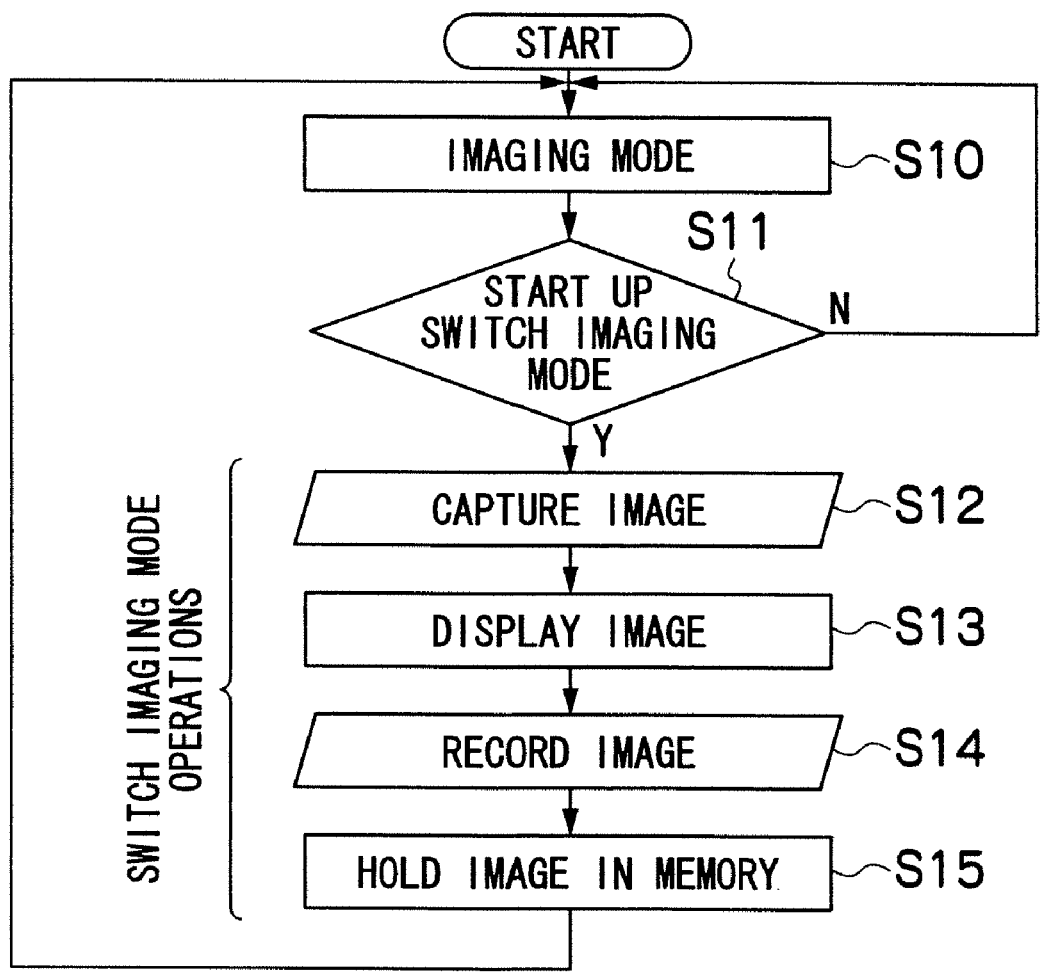
FIG. 7 is a flowchart showing a flow of processing in a switch imaging mode.
Figure 8:
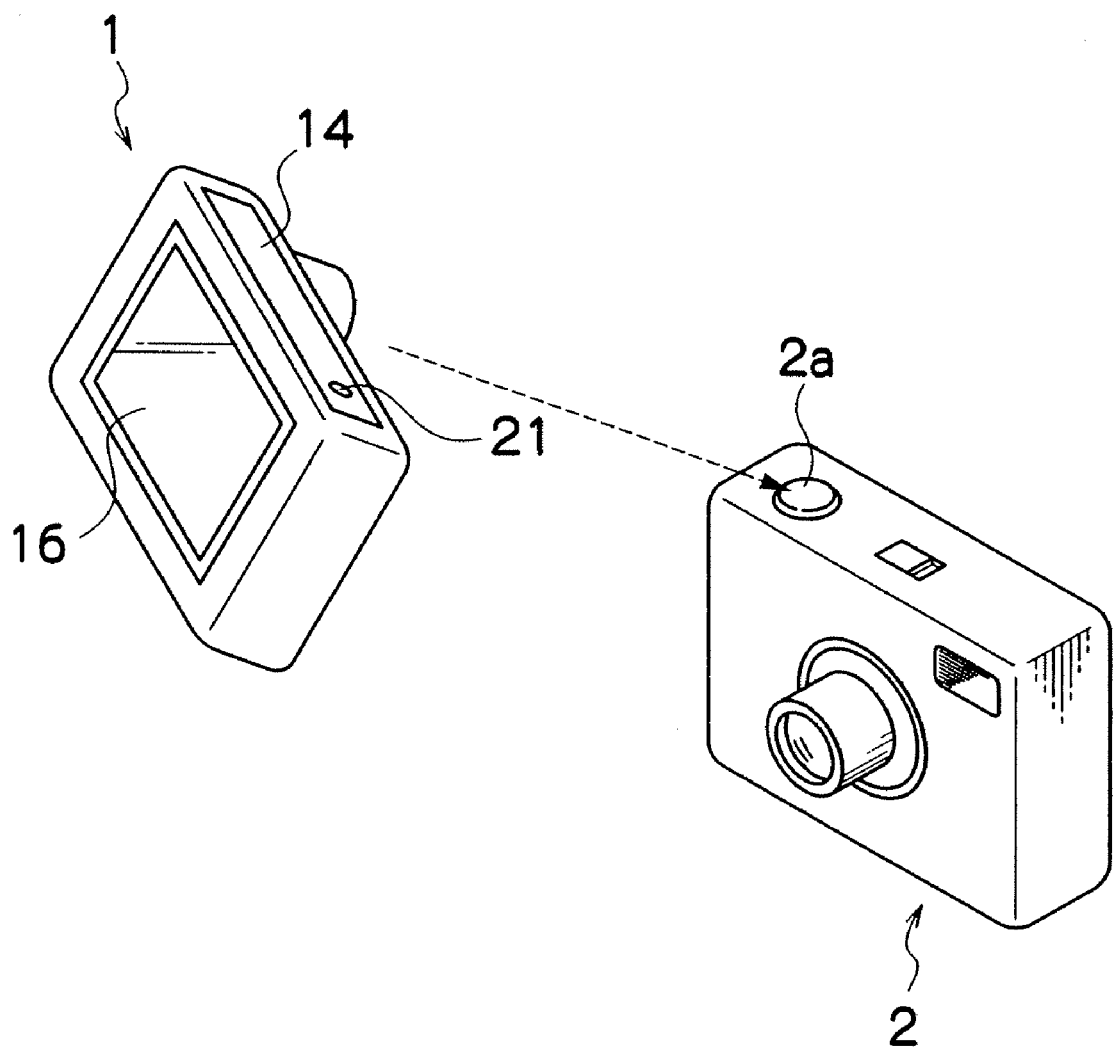
FIG. 8 illustrates an imaging method in the switch imaging mode.

First, the switch imaging mode for imaging the operations device is described with reference to FIG. 7.

The imaging mode is set using the mode switch (step S10). Thereafter, the processing judges whether the switch imaging mode has been started up using the mode dial (step S11). In the case that the switch imaging mode has not been started up (NO in step S11), step S10 is repeated.

In the case that the switch imaging mode has been started up (YES in step S11), when the user prepares a camera 2 having a preferred release button 2a and captures an image of the camera 2, the captured image is acquired and stored in the memory 120 (step S12).

A desired image among the images stored in the memory 120 is displayed on the display unit 17 (step S13), the displayed image is recorded as an image including a region which is desired for use as the release button (step S14), and the image is recorded in the memory 120 (step S15).

<Switch Image Recording Processing>

Figure 9:
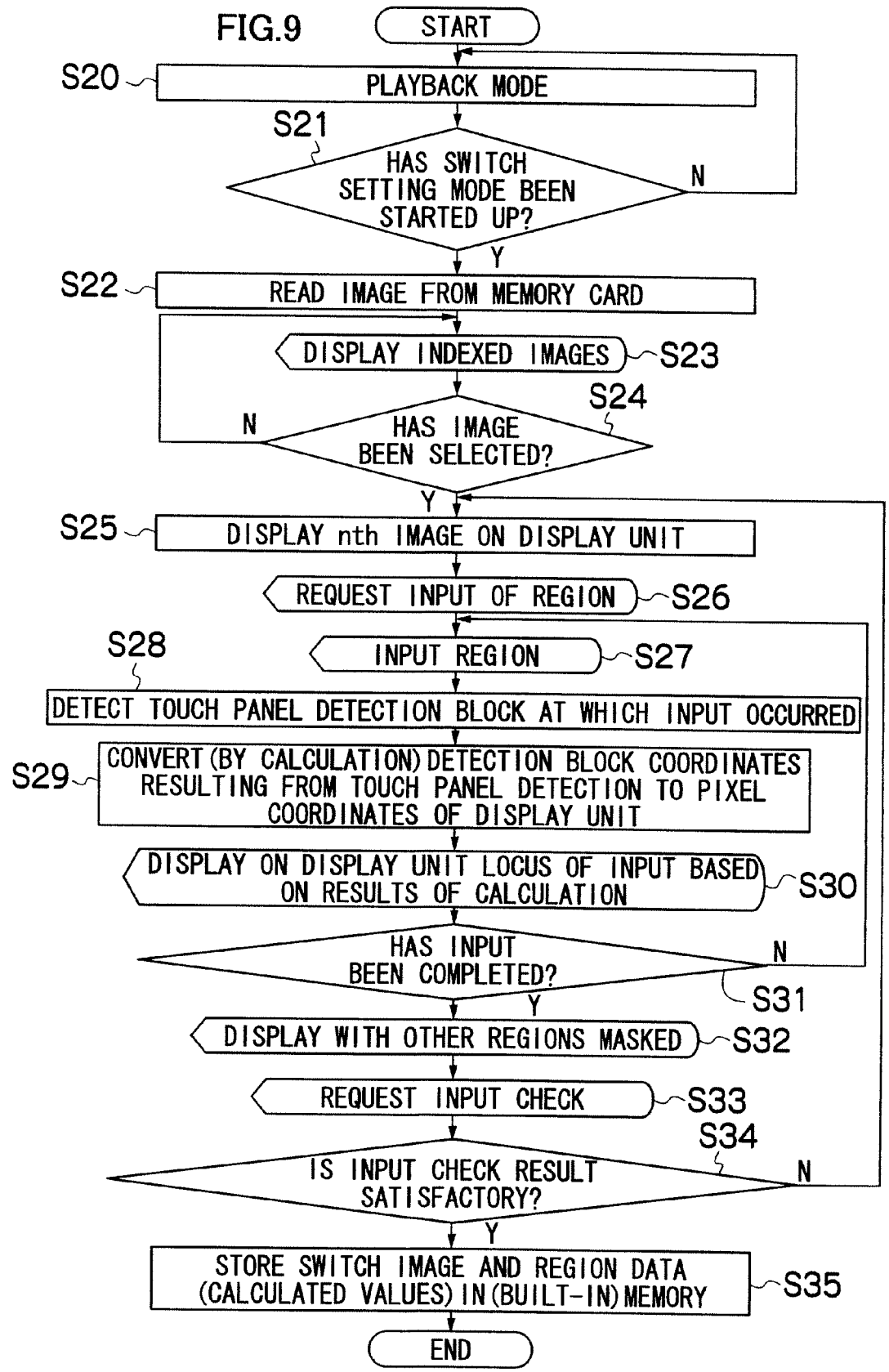
FIG. 9 is a flowchart showing a flow of processing of switch image recording processing.

The following describes processing for recording the release button using the button image, with reference to FIG. 9. The following processing is mainly performed by the operation image generation device 138.

The playback mode is set using the mode switch (step S20). Thereafter, the processing judges whether the switch setting mode has been started up using the mode dial (step S21). When the switch setting mode has not been started up (NO in step S21), step S20 is repeated.

When the switch setting mode has been started up (YES in step S21), images are read from the memory 120 which is built into the digital camera 1 (step S22), and the read images are displayed as indexed images on the display unit 17 (step S23).

The processing judges whether an image has been selected from the images displayed as indexed images (step S24).

When no image has been selected, step S24 is repeated.

Figure 10:
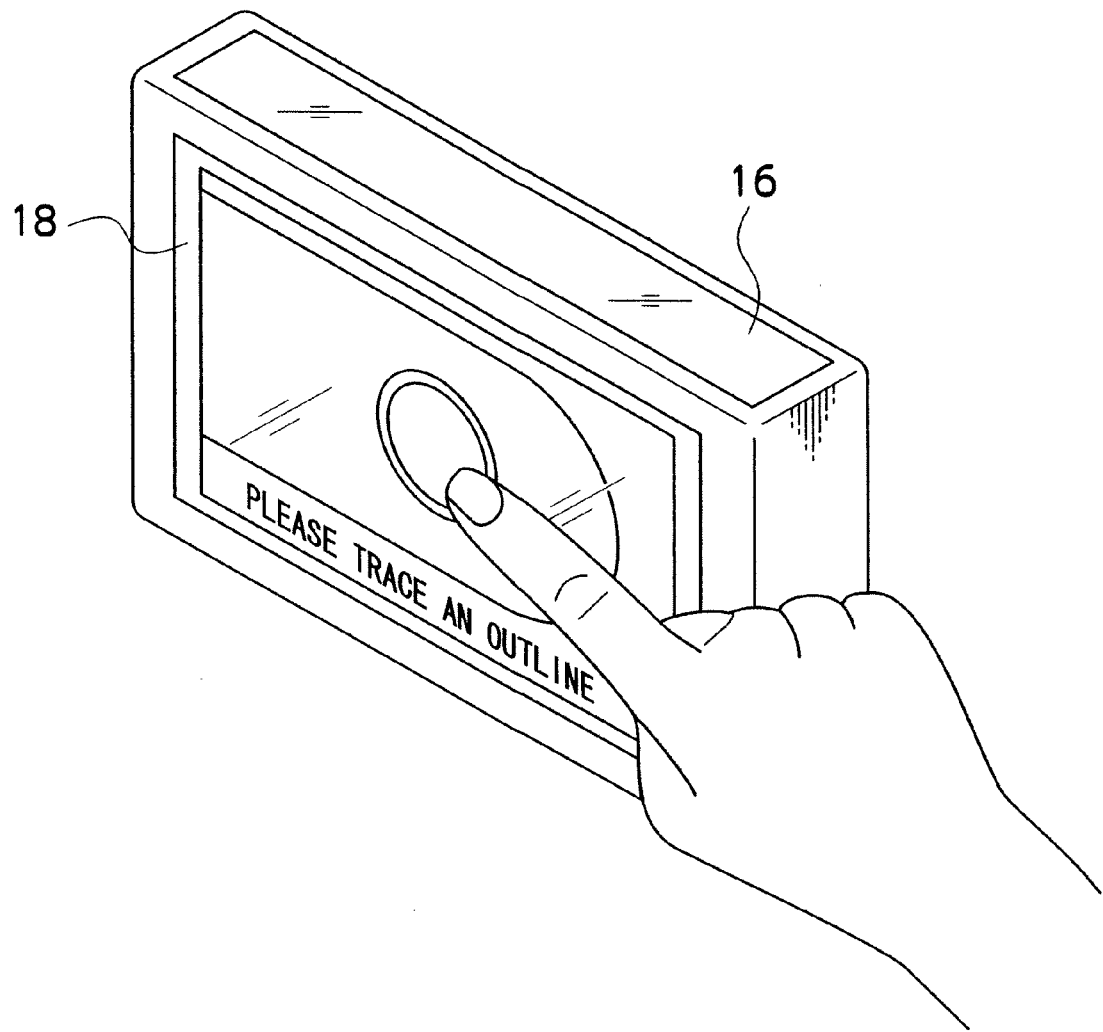
FIG. 10 illustrates region input in the switch image recording processing.

When an image has been selected, the selected image (an nth image where n is an integer) is displayed on the display unit 17 as shown in FIG. 10 (step S25). The image displayed on the display unit 17 can be viewed by the user through the touch panel 18 which is provided on a front surface of the display unit 17.

As shown in FIG. 10, input of the region desired for use as the release button is requested by displaying a message such as "Please trace an outline" as shown in FIG. 10 (step S26).

Input to the touch panel 18 is performed (step S27), and detection blocks of the touch panel 18 at which the input took place are detected (step S28). The input is performed by causing a pen, a finger, or the like to contact the detection blocks.

The coordinates of the detection blocks at which the input was detected are calculated. Then, based on the above-described Equation 2, the coordinates of the detection blocks of the touch panel 18 are converted to pixel coordinates of the display unit 17 (step S29).

Display is performed to indicate that input of step S27 has occurred at pixels of the display unit 17 with the coordinates calculated in step S29 (step 30). The display is performed by increasing the density of shading of the pixels with the calculated coordinates or the like. As a result, a locus of the input is displayed on the display unit 17.

The processing then judges whether the input of the region has been completed, which is to say whether input of a substantially closed region such as a circle, an ellipse, or a rectangle has been performed (step S31). When input of the region has not been completed, which is to say when the result of the input is not a substantially closed region (NO in step S31), the processing returns to step S27, and steps S27 to S31 are repeated.

Figure 11:
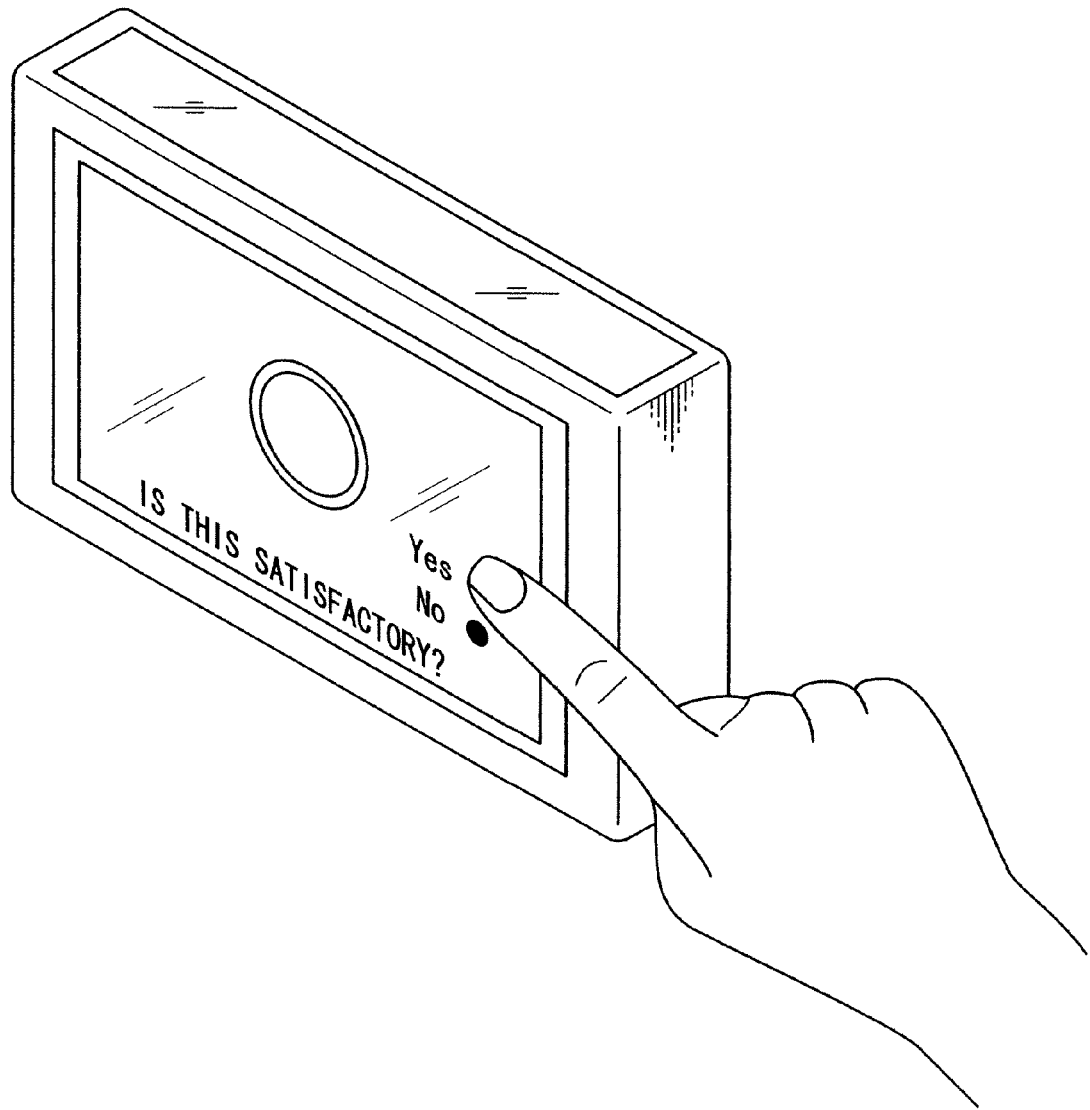
FIG. 11 illustrates an input check in the switch image recording processing.

When the input of the region has been completed, which is to say when the result of the input is a substantially closed region (YES in step S31), an image in which all regions other than the inputted substantially closed region are masked is displayed on the display unit 17 as shown in FIG. 11 (step S32). A request is then made to check whether the region desired for use as the release button has been correctly inputted by causing display of an "Is this satisfactory?" message or the like and YES/NO option buttons and judging whether an input occurs at the detection blocks of the touch panel 18 corresponding to the pixels displaying the "YES" button (step S33).

The processing then judges whether the input result for the check is "YES" (step S34). When the input result of the check is "NO", which is to say when the displayed image is not the image desired for use as the release button (NO in step S34), the processing returns to step S25, and steps S25 to S34 are repeated.

When the input result of the check is "YES", which is to say when the image displayed in step S32 is the image desired for use as the release button (YES in step S34), the image displayed on the display unit 17 (switch image) and corresponding region data (coordinates of the pixels at which the image is displayed) are stored in the memory 120 (step S35).

According to the above, the release button image, position and size are set and stored in the memory 120.

The above completes the processing for recording images for use as the various operation portions.

Note that although the indexed images are displayed and the image to be recorded is selected from among the indexed images in steps S23 and S24, the images stored in the memory 120 may be read and displayed sequentially (played back one at a time), and the image to be recorded may be selected from the resulting sequence of images.

<Operations Device Recording Processing>

Figure 12:
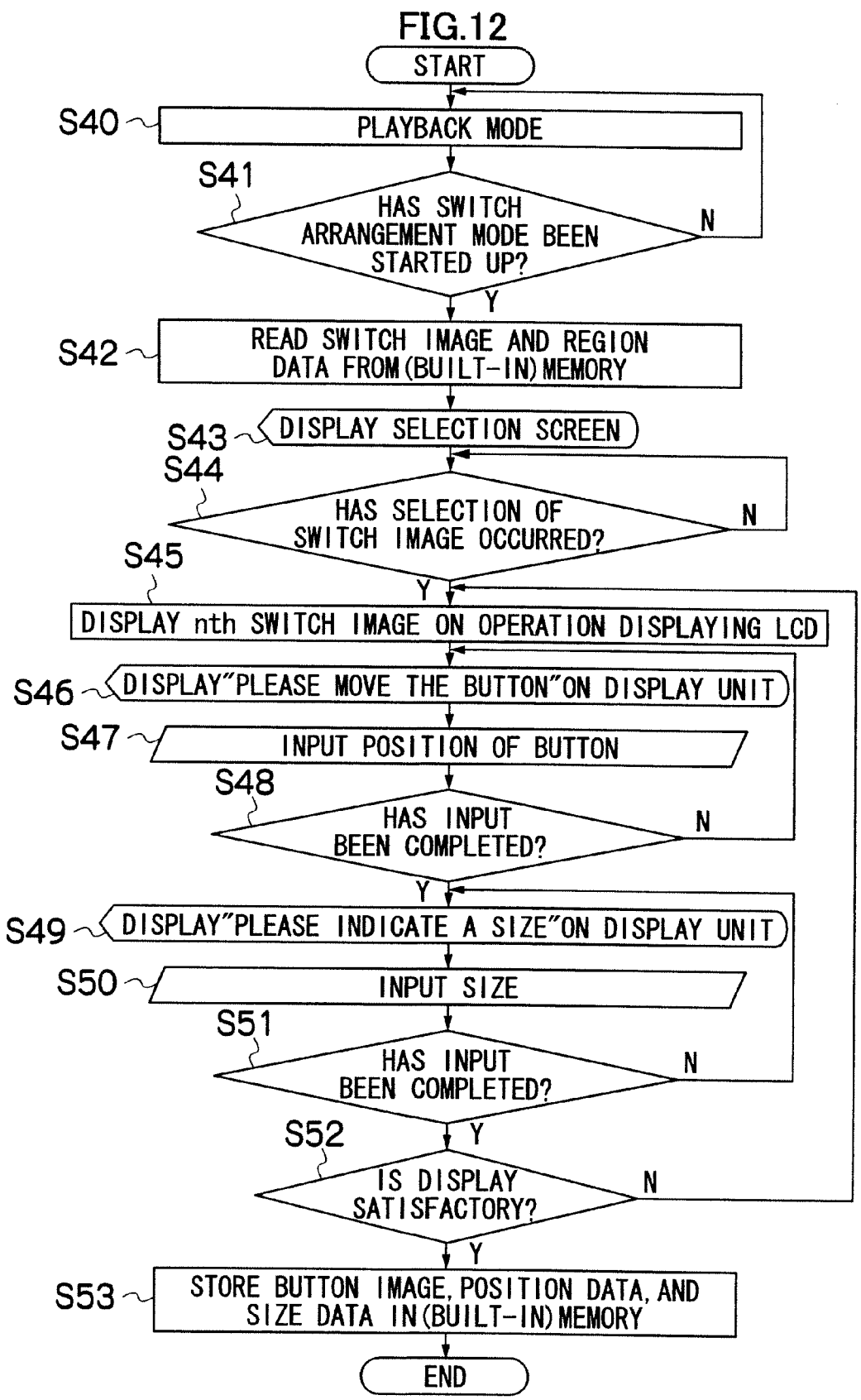
FIG. 12 is a flowchart showing a flow of processing of operations device recording processing.

Processing for recording an image as the release button recorded using the processing shown in FIG. 9 is described with reference to FIG. 12. The following processing is mainly performed by the operation image generation device 138.

The playback mode is set using the mode switch (step S40). Thereafter, the processing judges whether a switch arrangement mode has been started up using the mode dial (step S41). When the switch arrangement mode has not been started up (NO in step S41), step S41 is repeated.

Figure 13:
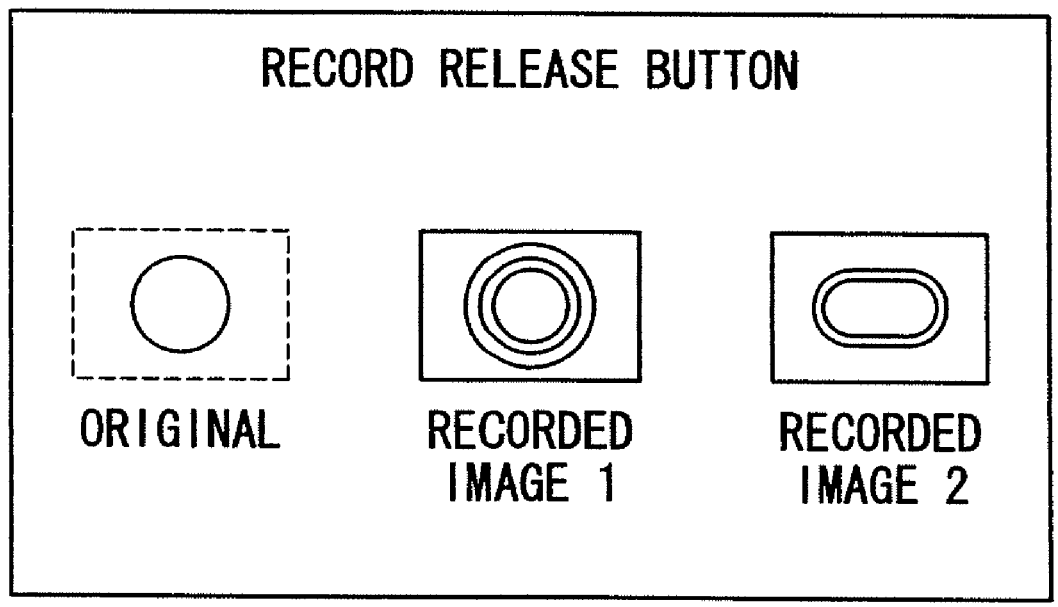
FIG. 13 shows a selection screen in the operations device recording processing.

When the switch arrangement mode has been started up (YES in step S41), a switch image and region data stored in the memory 120 in step S35 are read (step S42), and a selection screen of the type shown in FIG. 13 is displayed on the display unit 17 (step S43). In FIG. 13, the image stored in step 35 is assigned as a recorded image 1.

The processing judges whether a desired switch image has been selected from the selection screen of the type shown in FIG. 13 (step S44). When a desired switch image has not been selected (NO in step S44), step S44 is repeated.

Figure 14:
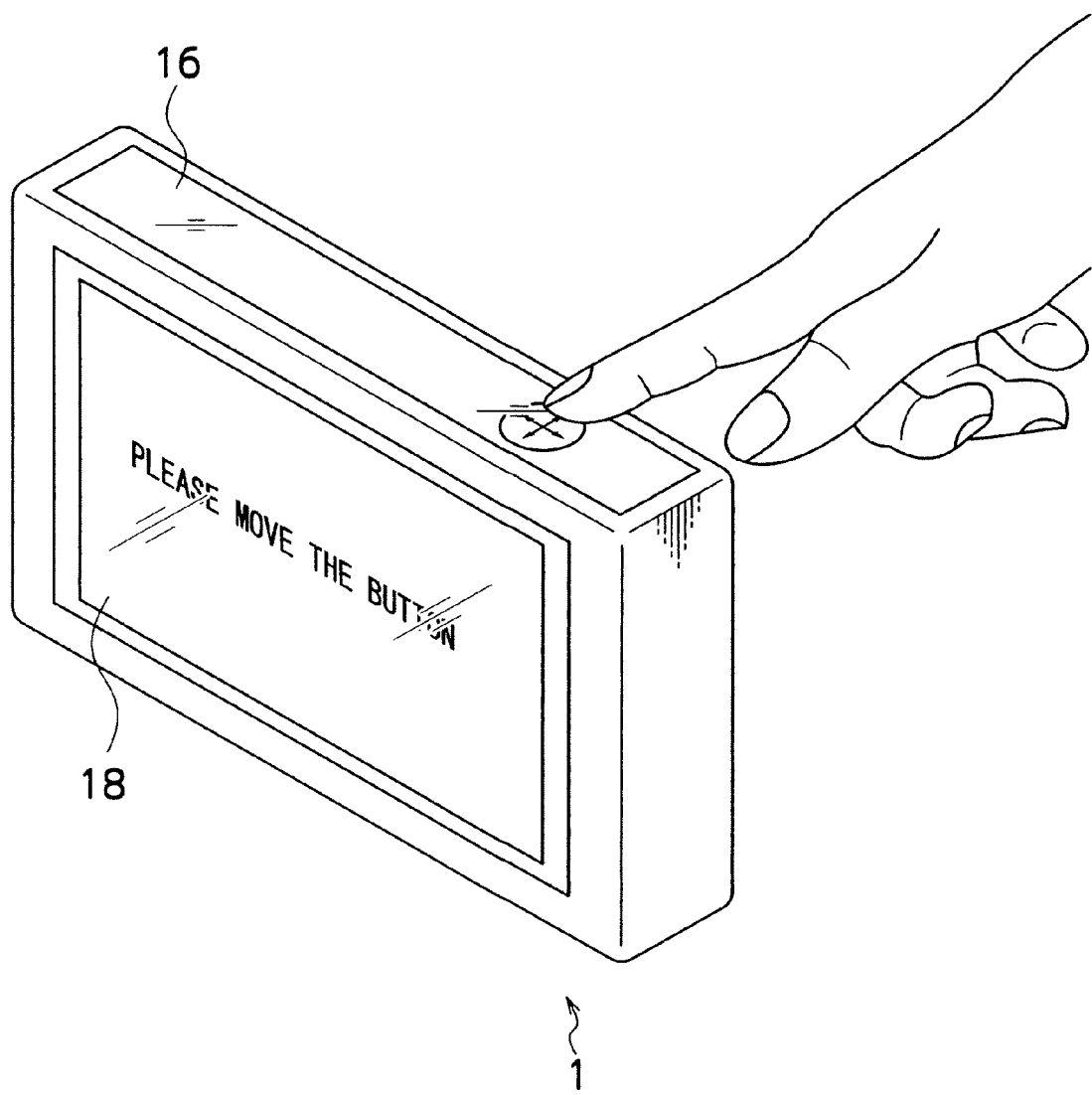
FIG. 14 illustrates an input of button position in the operations device recording processing.

When the desired switch image has been selected (YES in step S44), the selected switch image, location and size information, and outline information are read from the memory 120, and the switch image is displayed on the operation displaying LCD 15 based on the read information (step S45). In other words, when recorded image 1 is selected as the switch image on the "release button recording" selection screen shown in FIG. 13, the recorded image 1 is displayed at a predetermined location (here, the location at which the release button is disposed on a normal digital camera or the like) on the operation displaying LCD 15 as shown in FIG. 14.

With the desired switch image being displayed on the operation displaying LCD 15, a request for input of a button position is made by displaying a message such as "Please move the button" on the display unit 17 (step S46), and input of the button position is performed (step S47). The input of the button may, for instance, be performed by displaying arrows over the recorded image 1 being displayed on the operation displaying LCD 15, the user moving a finger or the like in the directions of the arrows, and the movement of the finger or the like being detected by the touch panel 16, thereby causing the recorded image 1 to move to the location desired for the release button.

The processing judges whether the input of the button position has been completed (step S48). When the input of the button position has not been completed (NO in step S48), the processing returns to step S46, and steps S46 to S48 are repeated.

Figure 15:
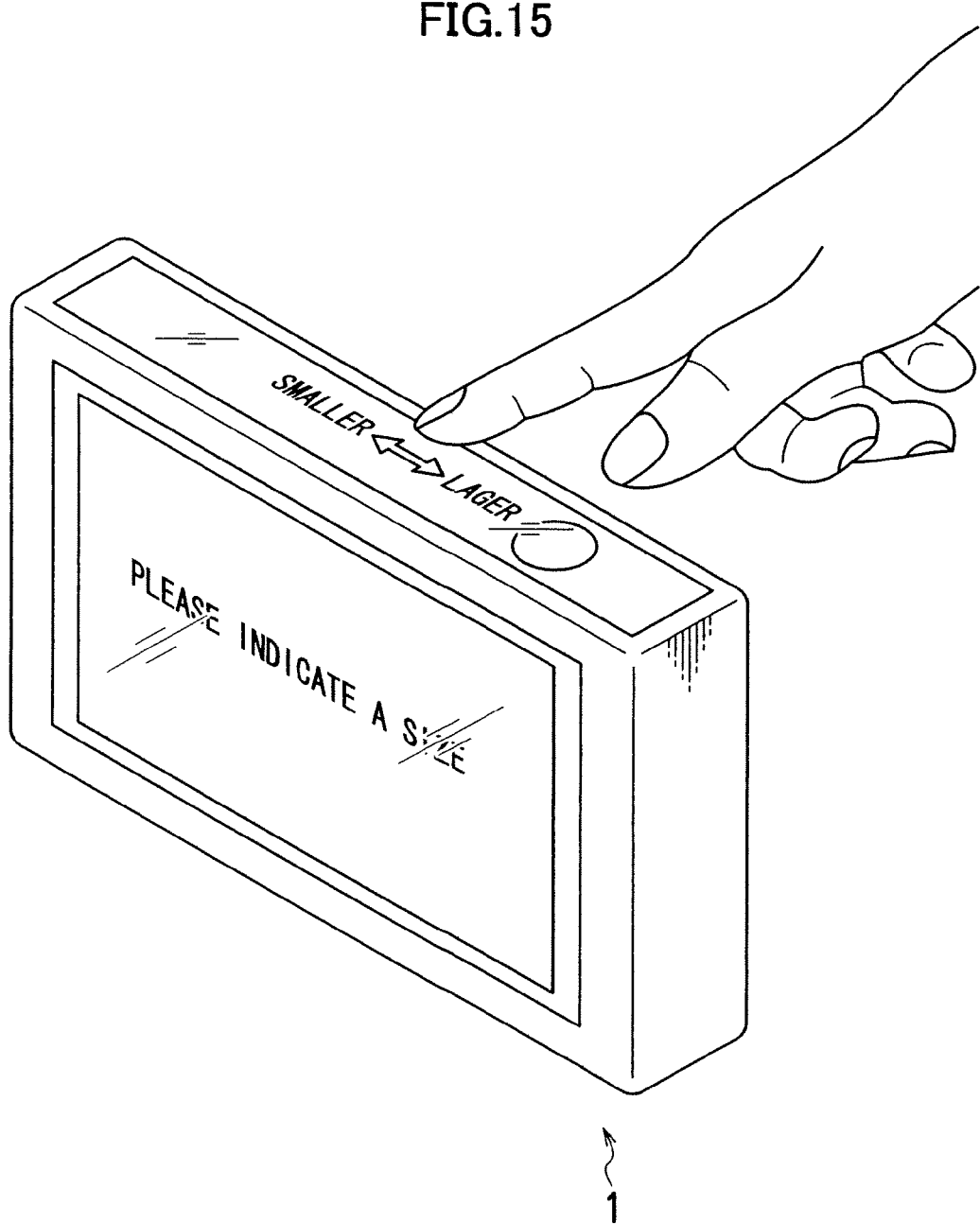
FIG. 15 illustrates an input of button size in the operations device recording processing.

When the input of the button position has been completed (YES in step S48), a request to specify a size of the button is made by displaying a message such as "Please indicate a size" on the display unit 17 (step S49), and an input of button size is performed (step S50). For instance, input of button size may be performed by displaying arrows beside the recorded image 1 displayed on the operation displaying LCD 15 as shown in FIG. 15, the user moving a finger or the like in the directions of the arrows, and the movement of the finger or the like being detected by the touch panel 16, thereby causing a change in size of the recorded image 1.

The processing judges whether the input of button size has been completed (step S51). When the input of the button size has not been completed (NO in step S51), the processing returns to step S49, and steps S49 to S51 are repeated.

Figure 16:
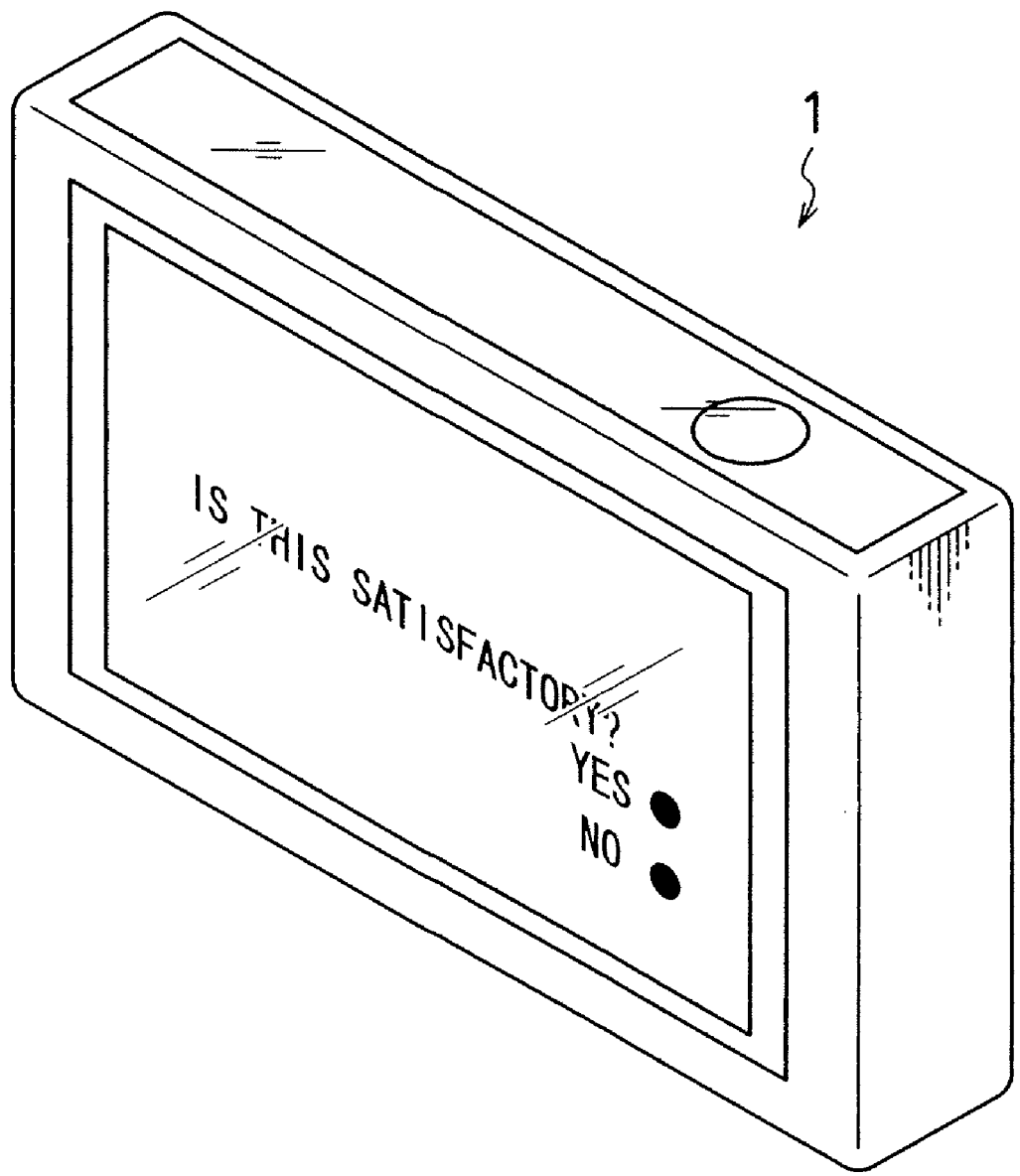
FIG. 16 is a diagram illustrating an input check in the operations device recording processing.

When the input of button size has been completed (YES in step S51), the processing judges whether an input indicating that a release button of a desired image, size, position and the like is being displayed on the operation displaying LCD 15 has been made (step S52). This judgment may, for instance, be performed by displaying a message such as "Is this satisfactory?" together with YES/NO option buttons on the display unit 17 as shown in FIG. 16, and judging whether an input to the detection blocks of the touch panel 18 which correspond to the pixels displaying the "YES" button has been made.

When the input result of the check is "NO", which is to say when a release button of the desired image, size and position is not being displayed on the operation displaying LCD 15 (NO in step S52), the processing returns to step S45, and steps S45 to S52 are repeated.

When the input result of the check is "YES", which is to say when a release button of the desired image, size, position and the like is being displayed on the operation displaying LCD 15 (YES in step S52), the data for the image, position, and size of the release button displayed on the operation displaying LCD 15 is stored in the memory 120 (step S53).

Figure 17:
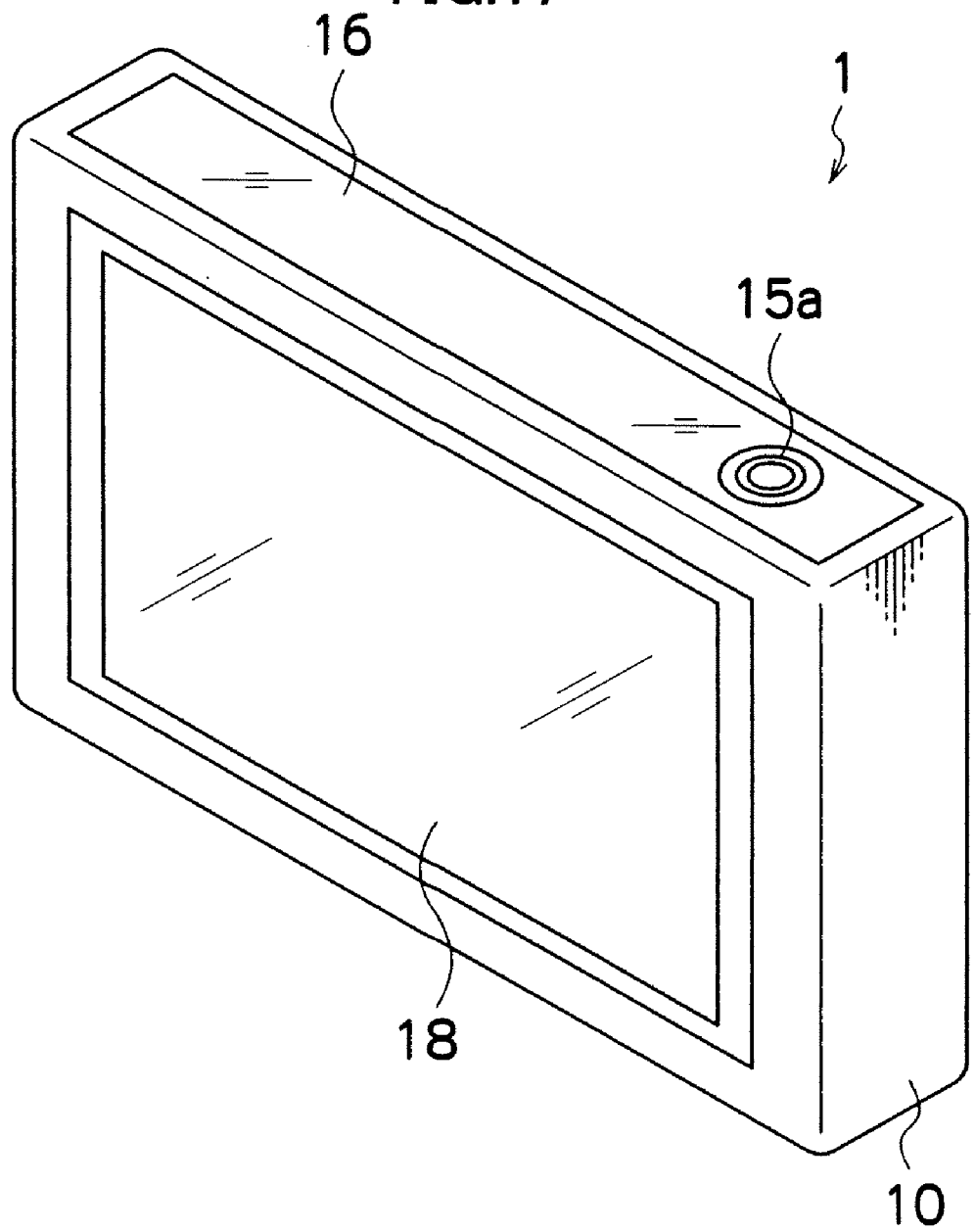
FIG. 17 is an example of display of a recorded release button.

This procedure completes the recording of a desired release button. Thereafter a release button 150a of the type shown in FIG. 17 is displayed on the operation displaying LCD 15.

To make use of the release button 150a recorded in the manner described above, it is necessary to perform settings for inputs to the touch panel 16 using the image of the release button 150a. When the release button is used, a finger is generally placed on the release button and pressed to switch between S1 and S2 as required. Hence, it is necessary to perform settings so that the release operations S1 and S2 are not performed when the finger simply makes contact with the release button, but rather when inputs at predetermined force are made to the corresponding detection blocks.

Figure 18:
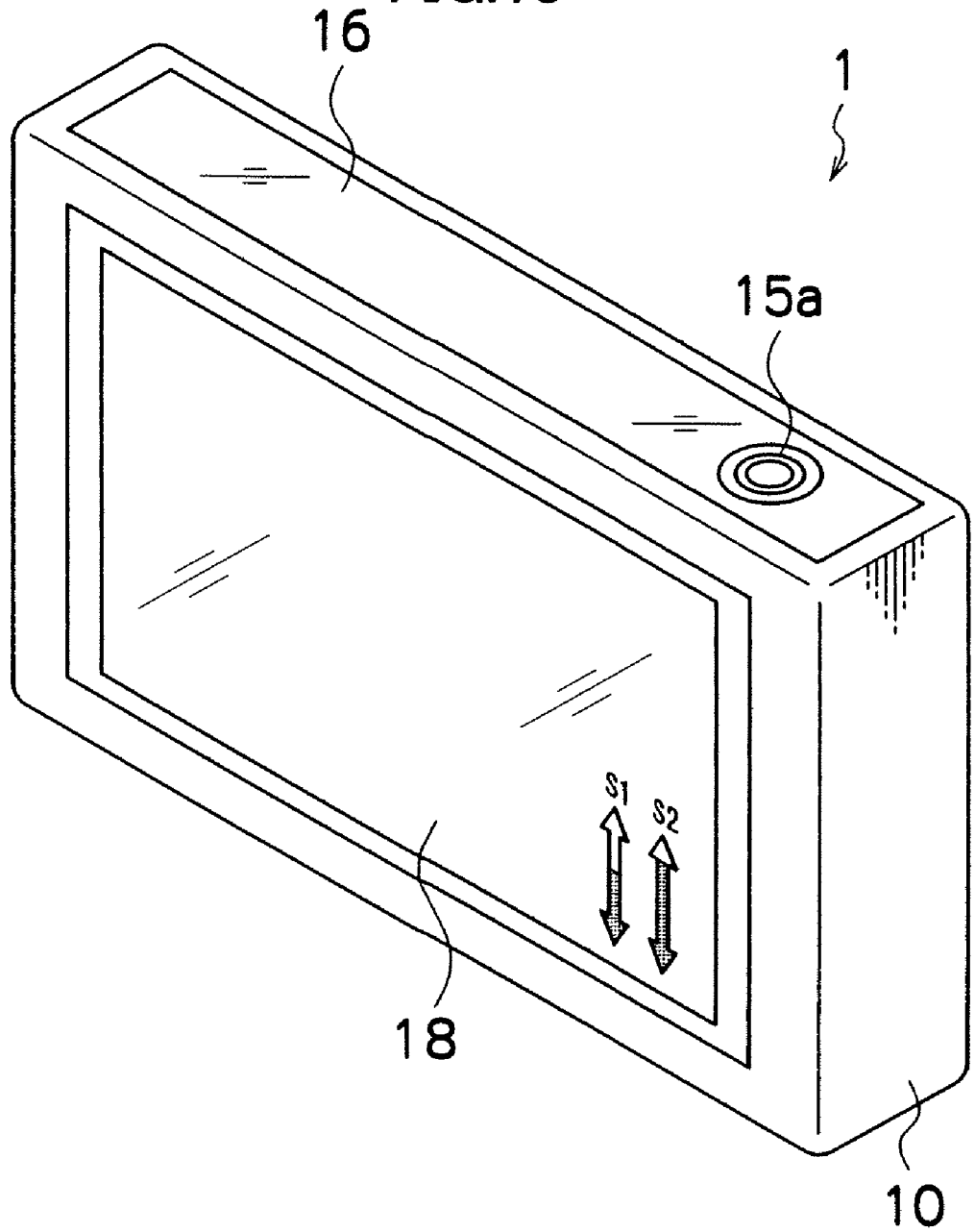
FIG. 18 illustrates a release button setting method.

The release button settings may, for instance, be performed by inputting, to the detection blocks of the touch panel 16 corresponding to the release button 150a, input strengths to cause the S1 and S2 operations respectively, as shown in FIG. 18. When the release button 150a is pressed, the input strengths to cause the S1 and S2 operations may be indicated using arrows displayed on the display unit 17, and the user can set the input strengths to the detection blocks for the S1 on and S2 on operations while viewing the display.

Hence, when the user presses the detection blocks of the touch panel 16 which correspond to the pixels displaying the release button 150a using a finger and an input of the set strength is detected, the predetermined operation, in this case the release operation (S1 or S2), is executed.

According to the present embodiment, images of variety of switches or operations device members captured using a digital camera can be used to change the design of an operations device or the like to match the shape and appearance of a desired image. Further, it is possible to freely customize the position and shape of the operations device or the like to match the length and width of the user's fingers.

According to the present embodiment, it possible to change the detection range and position of the operations device and like rather than just the appearance of the operations device. Thus, capturing an image of all the operation portions or the like of, for instance, a habitually used silver-halide camera, and realizing, in an unaltered form, the functions, appearance, and position of these operation portions or the like in the digital camera makes it possible to realize an operability that is similar to the operability of the habitually used silver-halide camera.

According to the present embodiment, it is possible to customize an operation portion and the like of the camera to a given design, by designing switches and the like of a desired form on paper and capturing an image of the design.

According to the present invention, the desired an operation portion and the like are recorded in a built-in memory of the apparatus. As a result, the recorded data are not lost when the removable memory is changed, and it is possible to freely alter the recorded an operation portion and the like.

Note that although in the present embodiment the shape of the regions is detected by tracing on the displayed image, the desired region included in the image may be automatically extracted. Various known techniques, such as a region growing method and the like can be used as methods for automatically extracting the desired region. Since image capture is generally performed in such a way that the desired image falls in a substantially central location, a substantially closed region located in a central vicinity of the image may be extracted as the desired region. Alternatively, all substantially closed regions captured in the image may be extracted and the user may be allowed to select a desired image from among the extracted plurality of substantially closed regions. Another possibility is that the user indicates given points and a substantially closed region including the indicated points is extracted as the desired image. Hence, it is possible to extract the desired region in a simple manner.

Also, although in the present embodiment a region corresponding to the inputted locus is extracted as both the release button image and as the region caused to function as the release button, the region of the image for use as the release button image and the region to be caused to function as the release button may be extracted separately. Hence, it is possible to customize the digital camera freely by altering the positions and shape of the operation portion and the like.

In the processing in the present embodiment to record images for use in the various operation portions, the images and the region data (coordinates of the pixels at which the images were displayed) were stored in the memory. However, the images alone may be stored, the image data read from the memory, and the image data converted to the region data before display on the operation displaying LCD.

Although in the present embodiment the release button is displayed on the operation displaying LCD provided on the upper surface of the camera body 10, the release button may be displayed on the display unit of the rear surface. Alternatively, the display unit may be selected to display the release button or the like at an initial stage in the operations device recording processing.

Although in the present embodiment the requests were made by displaying text, the requests may be made using audio or the like. Further, the messages may be displayed on the operation displaying LCD 15 rather than on the display unit 17.

Figure 19:
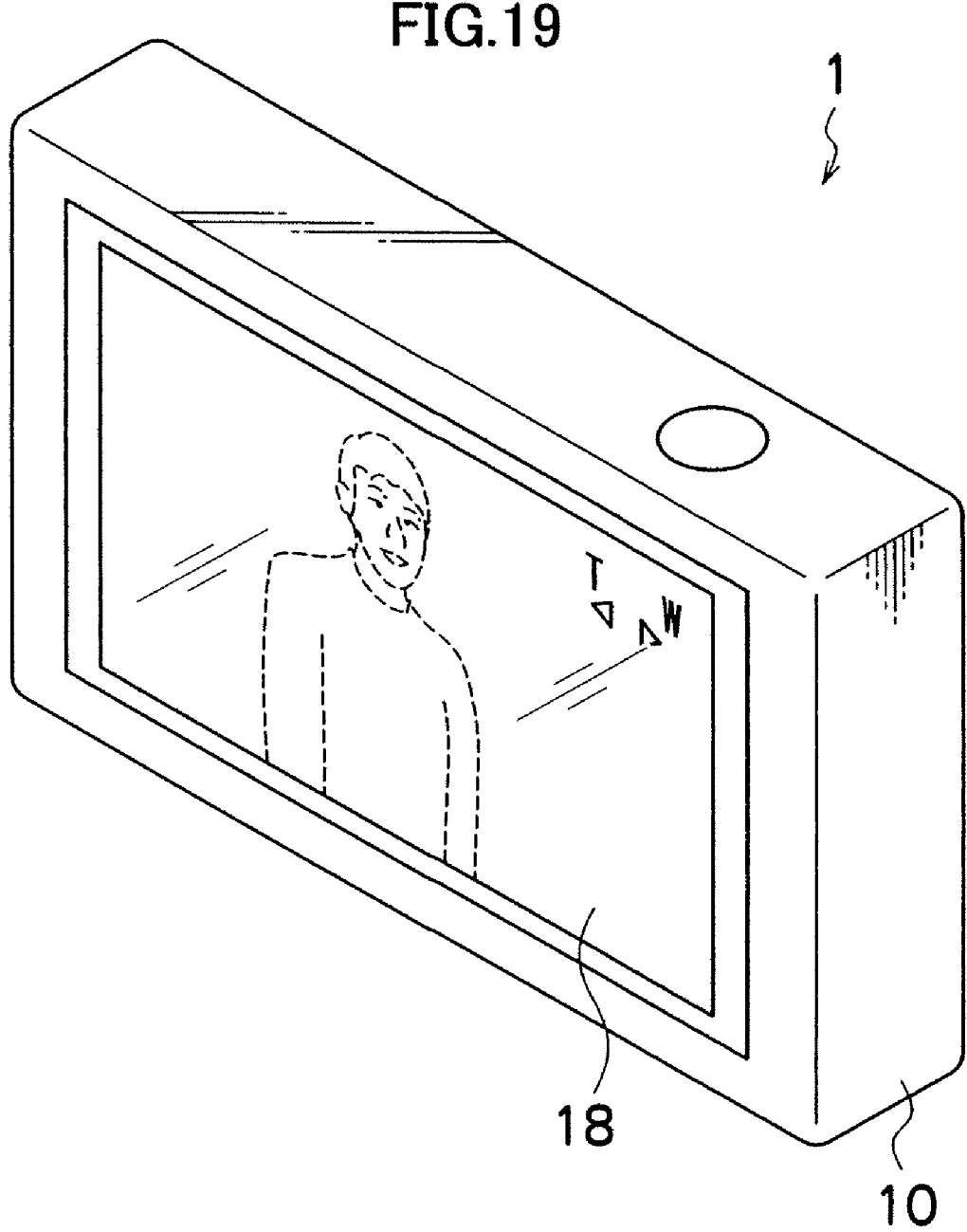
FIG. 19 is an example in which the liquid crystal display and touch panel are only provided on a rear surface.
Figure 20:
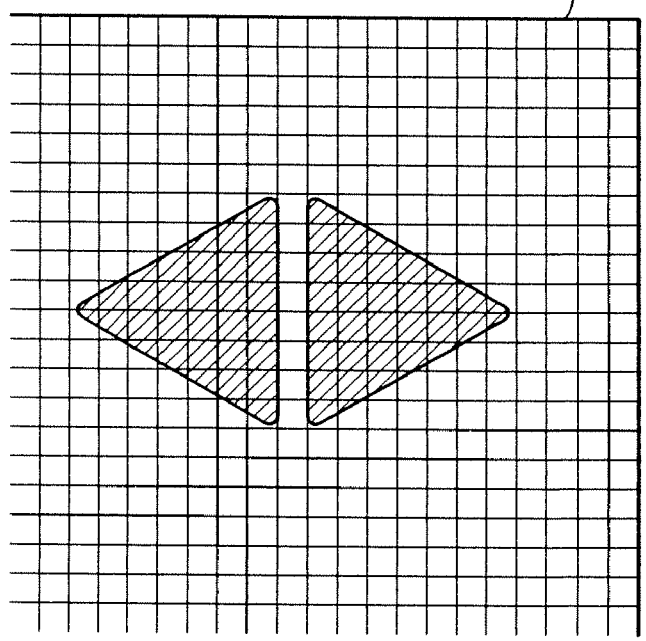
FIG. 20 is an example in which the liquid crystal display and touch panel are only provided on the rear surface.

Although in the present embodiment the liquid crystal displays and touch panels are provided on the upper surface and the side surface of the camera body 10, the liquid crystal displays and touch panels can be provided on any surface other than the front surface on which a lens and the like is provided. Further, the number of liquid crystal display and touch panel combinations is not limited to being two, and may be one, three, or more than three. For instance, the liquid crystal display may be provided exclusively on the rear surface of the camera body 10, and the operation portion and the like displayed on this liquid crystal display as shown in FIG. 19. As shown in FIG. 20, the operations of the zoom tele button and the zoom wide button are performed in response to input detected by the detection blocks corresponding to the pixels displaying the zoom switch. FIG. 19 and FIG. 20 show examples of recorded zoom switches. Note, however, that the redesigning is not limited to the zoom switch, and it is possible to design other operation portion such as the mode selection button, the flash mark, and the like.

Since the present embodiment is described using the release button as an example, the release operations are not performed when contact with the touch panel is detected, but rather when an input of a predetermined strength had occurred. However, for some operation portion input settings may not be required, and the corresponding predetermined operations may be performed upon detection of contact with the touch panel.

Second Embodiment

The following describes a digital camera 2 of the second embodiment. The digital camera 2 receives light which has passed through a lens using an image sensor, converts the light to digital signals, and stores the digital signals in a storage medium. Note that parts which are identical to those of the first embodiment are labeled with the same symbols, and descriptions of these parts are omitted.

Figure 21:
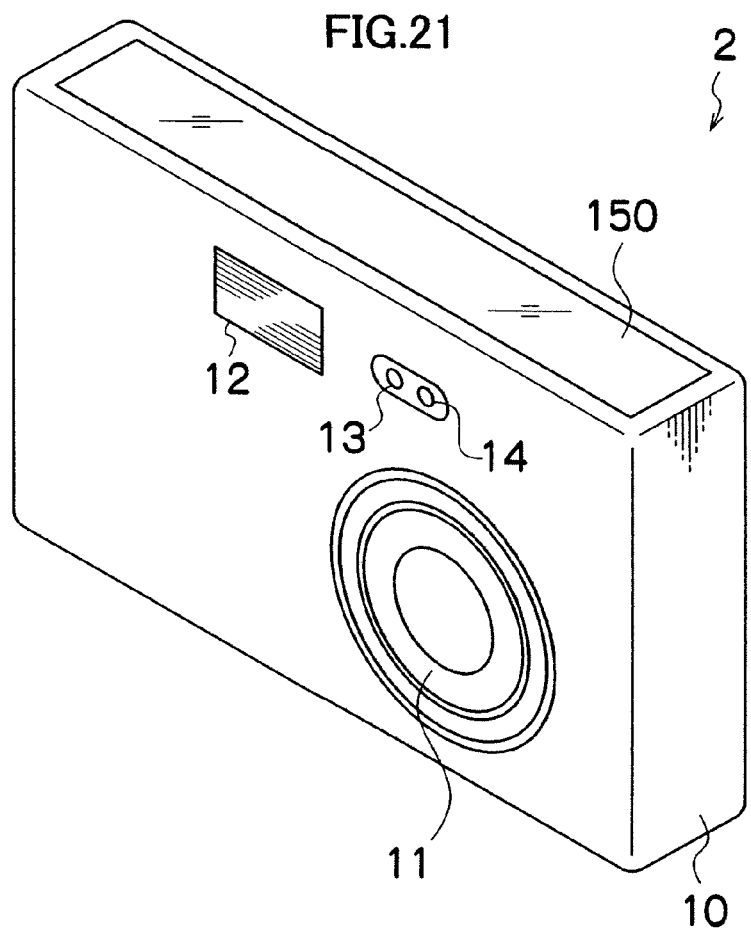
FIG. 21 is front perspective view of a digital camera 2 of the present invention.

FIG. 21 is a front perspective view showing an embodiment of the digital camera 2. A camera body 10 of the digital camera 2 is formed as a four-cornered box with oblong sides, and a lens 11, a flash 12, an AF auxiliary light lamp 13, a flash adjustment sensor 14, and the like are provided on a front surface of the box as shown in FIG. 20. An operation displaying LCD 150, and a three-dimensional display device 160 are provided on an upper surface of the camera body 10. Further, a display unit 17 and a touch panel 18 are provided on a rear surface. Note that a threaded tripod hole and a battery insertion part and a memory card slot are provided via an openable cover on a lower surface on the camera body 10 not shown in the drawings, and a battery 19 and a memory card 20 are installed in the battery insertion part and the memory card slot respectively.

Figure 22:
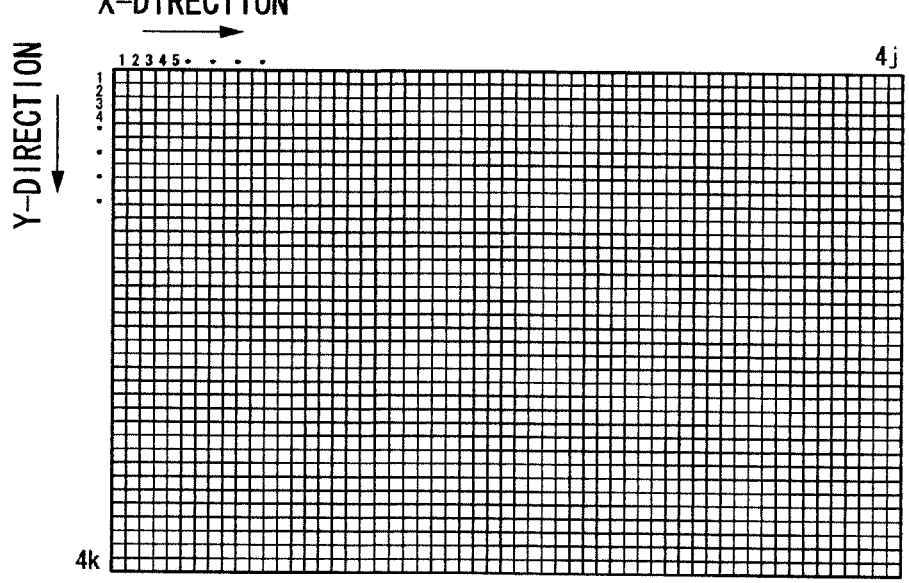
FIG. 22 is a diagram showing the construction of the liquid crystal display of the digital camera 2.

The operation displaying LCD 150 is a liquid crystal display capable of color display, and includes a two-dimensional arrangement of pixels with Nj (where N and j are integers) pixels in the x-direction and Nk (where N and k are integers) pixels in the y-direction, as shown in FIG. 22. The operation displaying LCD 150 is used as a user interface display panel by being caused to display an operation portion such as a release button, a mode switch and a mode dial. Note that, in the present embodiment, an example in which N is 4 is described. The operation displaying LCD 150 is a flexible liquid crystal display arranged so that raised and lowered portions displayed on the three-dimensional display device 160 are transferred.

Figure 23:
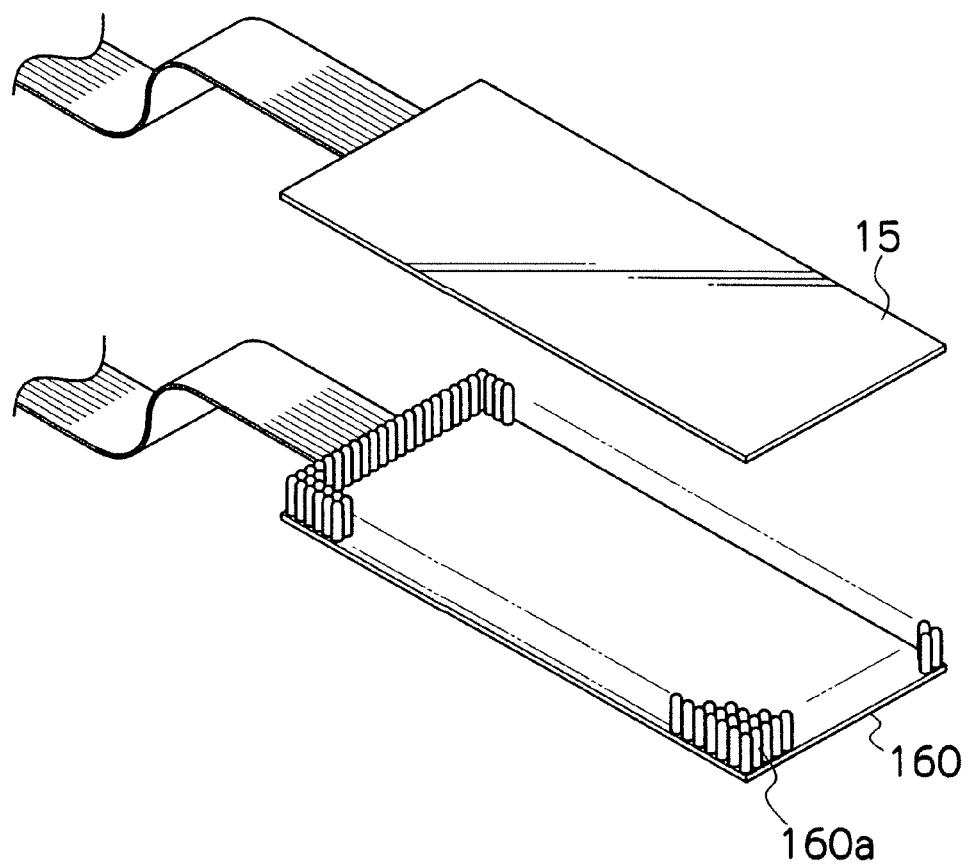
FIG. 23 is a diagram illustrating an arrangement of a liquid crystal display and a touch panel in the digital camera 2.

The three-dimensional display device 160 is provided on a rear surface of the operation displaying LCD 150 as shown in FIG. 23, and is provided pressed against the operation displaying LCD 150 so that surface undulations are transferred to the operation displaying LCD 150. The three-dimensional display device 160 has a plurality of three dimensional display elements 160a which are movable relative to one another, have a detection function for detecting an external force, and have a two-dimensional arrangement with j elements (where j is an integer) in the x-direction and k elements (where k is an integer) in the y-direction.

Figure 24:
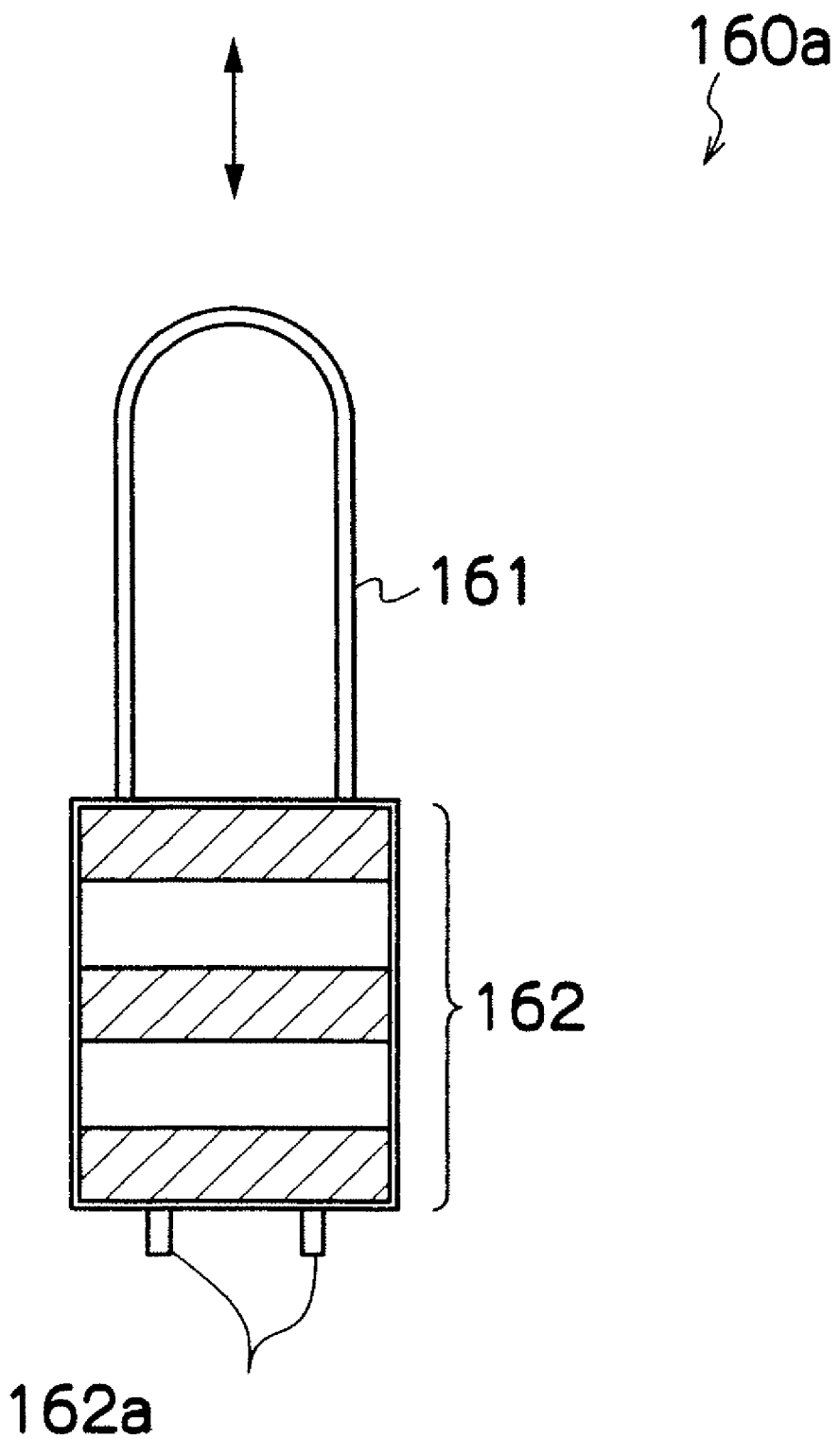
FIG. 24 is a diagram showing a construction of three-dimensional display elements of the digital camera 2.

Each three-dimensional display element 160a is mainly constructed from a substantially cylindrical rod 161 and a stacked-type piezoelectric actuator 162, as shown in FIG. 24. In the stacked-type piezoelectric actuator 162, electrodes 162a are arranged facing the rod 161 and apply a voltage to the stacked-type piezoelectric actuator 162. When a voltage is applied to the stacked-type piezoelectric actuator 162 via the electrodes 162a, the stacked-type piezoelectric actuator is driven in a longitudinal direction (in the direction of the arrow in FIG. 24), and the change is transmitted to the rods 161 via an expansion mechanism not shown in the drawings, causing the rod to move vertically. In the three-dimensional display device 160, the three-dimensional display elements 161a are individually controlled by a system control circuit (described later), and the various operation portions are three dimensionally displayed by changing the height of the rods 161. When ends of the rods 161 are pressed from an external position, a back electromotive force generated by the stacked-type piezoelectric actuator 162 is detected. Consequently the strength of the force applied to the stacked-type piezoelectric actuator 162 is detected via the rods 161. Thus, it is possible to use the three-dimensional display elements 160a as switches.

The three-dimensional display elements 160a of the three-dimensional display device 160 are provided in a one-to-four correspondence with the pixels of the operation displaying LCD 15, so that the relative position of a desired pixel A of the operation displaying LCD 150 and a given three-dimensional display element 160a is given by a calculation of the type shown in Equation 1.

$$a = A \times (1/4) \qquad \text{[Equation 1]}$$

Figure 25:
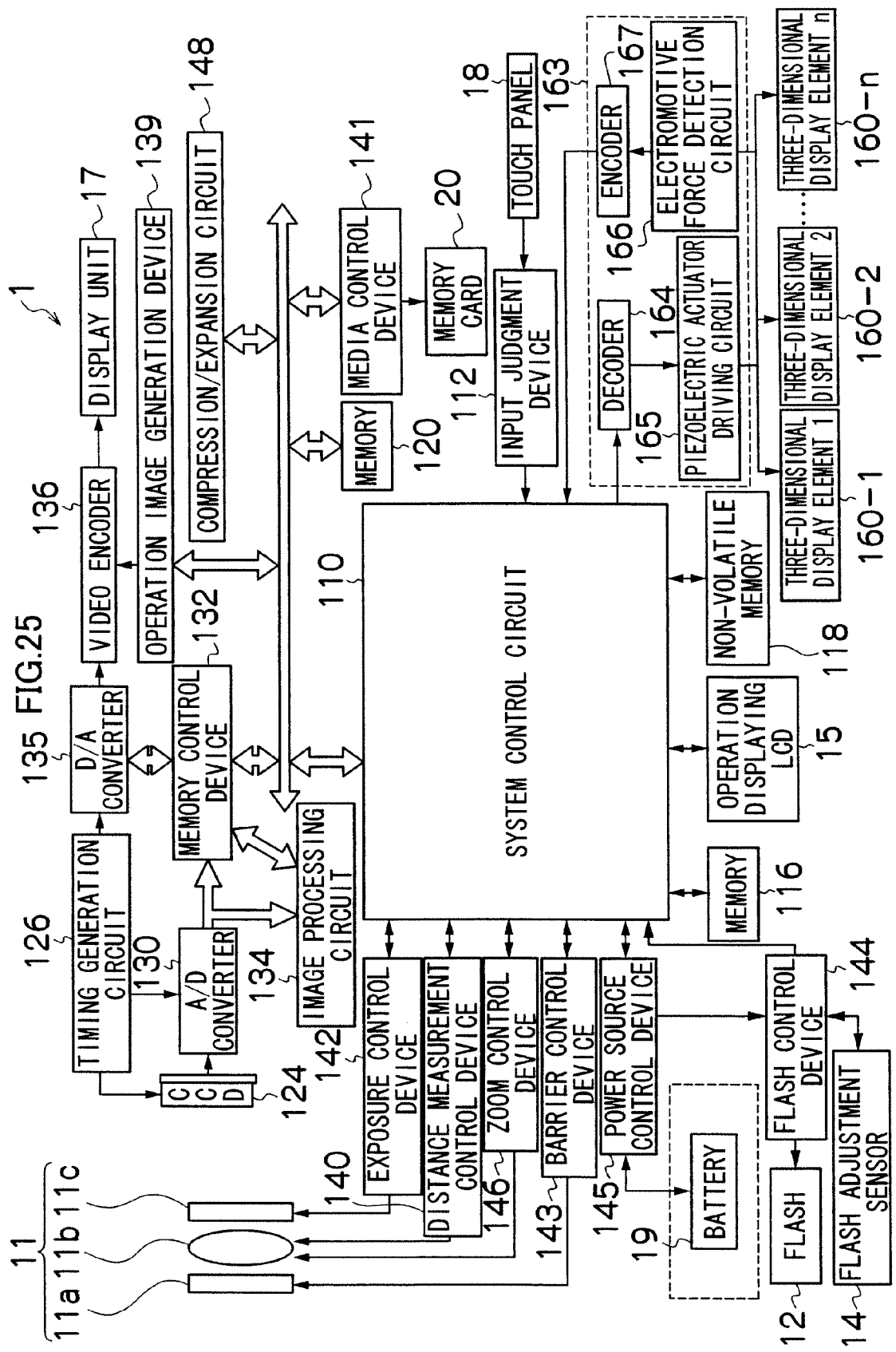
FIG. 25 is a block diagram showing an electrical construction of the digital camera 2.

The following describes an electrical construction of the digital camera 2. FIG. 25 is a block diagram showing the electrical construction of the digital camera 2. As shown in FIG. 25, the digital camera 2 includes a system control circuit 110, an input judgment device 112, a memory 116, a non-volatile memory 118, a memory 120, an image sensor 124, a timing generation circuit (TG) 126, an A/D converter 130, a memory control device 132, an image processing circuit 134, a video encoder 136, an operation image generation device 139, a distance measurement control device (AF device) 140, an exposure control device (AE device) 142, a barrier control device 143, a zoom control device 146, a compression/expansion circuit 148, a media control device 150, a flash control device 152, a three-dimensional display control device 163 and the like.

The operation image generation device 139 creates images for use as an operation portion based on images acquired by the image sensor 124. Note that the details of the operation image generation device 139 are described later.

The three-dimensional display control device 163 is constructed from a decoder 164, a piezoelectric actuator driving circuit 165, an electromotive force detection circuit 166, and an encoder 167. The piezoelectric actuator driving circuit 165 controls a voltage applied to the stacked-type piezoelectric actuator 162 in accordance with instructions inputted from the system control circuit 110 via the decoder 164. The electromotive force detection circuit 166 detects the back electromotive forces from the stacked-type piezoelectric actuator 162 which are generated by pressing from an external position on the ends of the rods 161, and outputs to the encoder 167. The three dimensional display elements 160a which make up the three-dimensional display device 160 are all controlled by performing the above-described processing for each of the three-dimensional display elements 160a in turn.

The following describes operations of the digital camera 2 of the present embodiment constructed in the manner described above. Since the procedures for general imaging and recording processing are identical to those of the first embodiment, descriptions of these procedures are omitted here.

The following describes details of the operation image generation device 139. In the operation image generation device 139, processing (switch imaging mode) to acquire the images for use in the various operation portions, processing (switch image recording processing) for recording the images for use in the various operation portions, and processing (operations device recording processing) to record the various operation portions is performed. The following describes an example of a case in which a release button is recorded as an operations device. Note that since the switch imaging mode is identical to that of the first embodiment, a description of this mode has been omitted.

<Switch Image Recording Processing>

Figure 26:
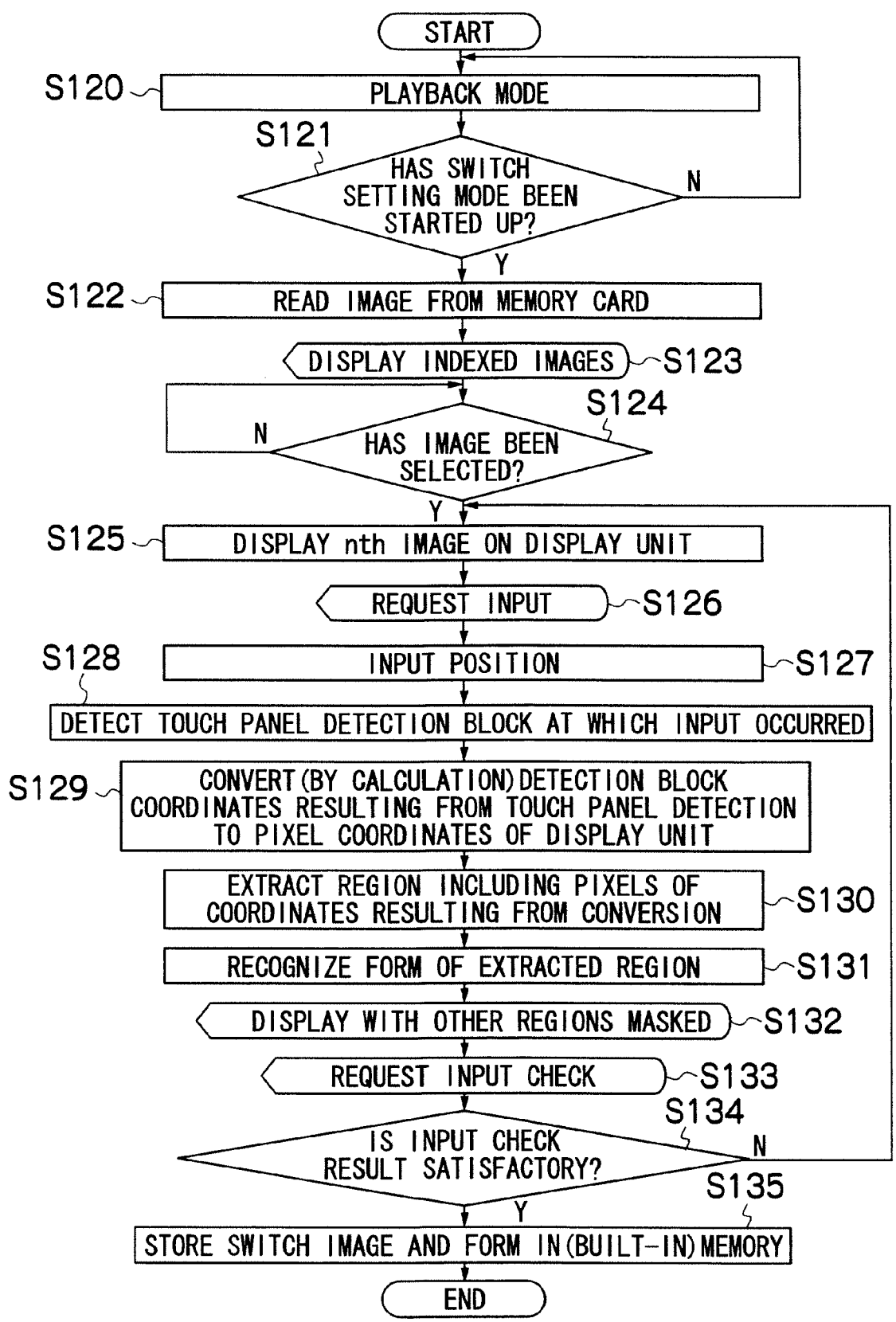
FIG. 26 is a flowchart showing a flow of processing of the switch image recording processing.
Figure 27:
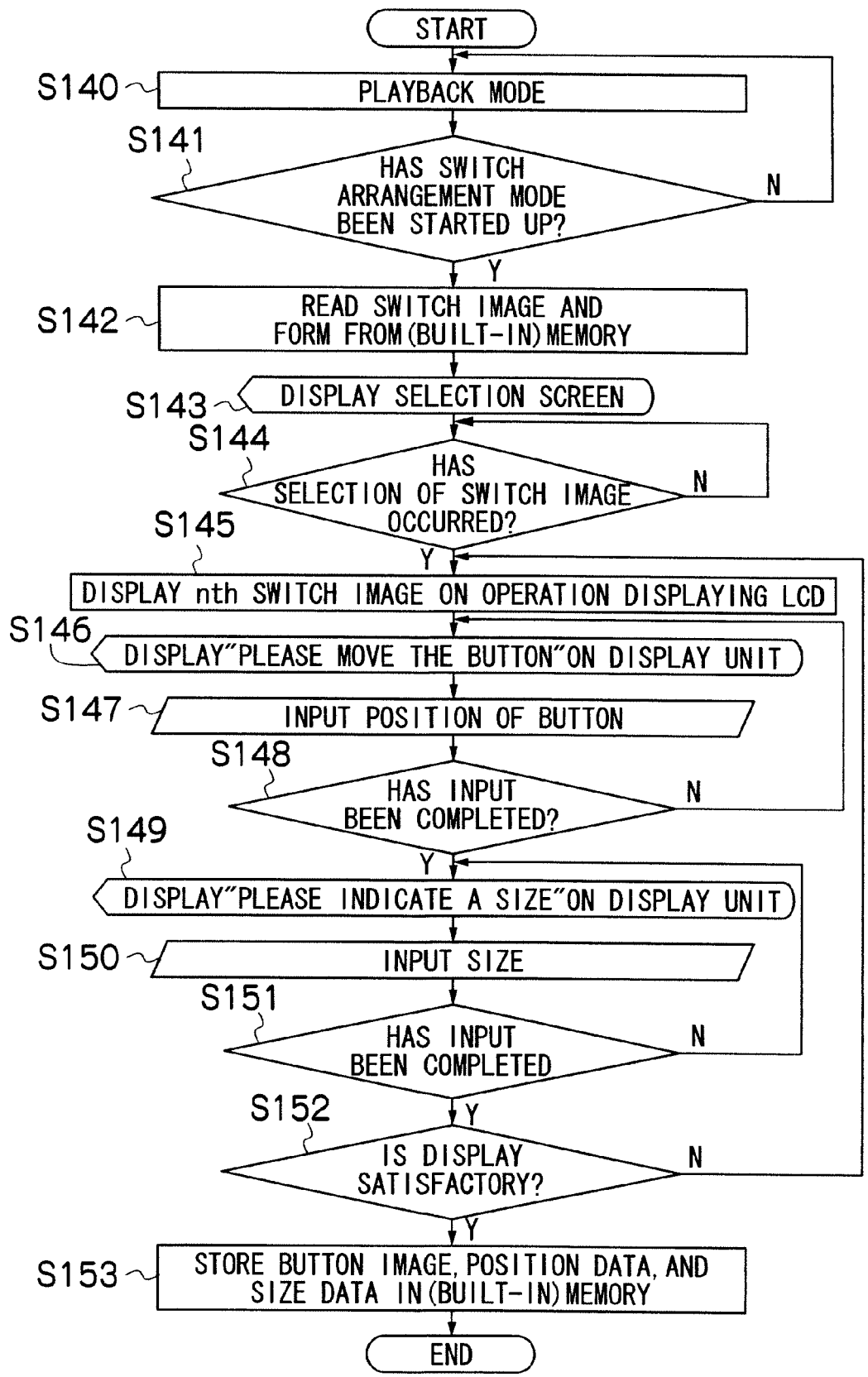
FIG. 27 is a flowchart showing a flow of processing of the operations device recording processing.

The following describes processing to record the release button using the button image, with reference to FIG. 26. The following processing is mainly performed by the operation image generation device 139.

The playback mode is set using the mode switch (step S120). Thereafter, the processing judges whether the switch setting mode has been started up using the mode dial (step S121). When the switch setting mode has not been started up (NO in step S121), step S120 is repeated.

When the switch setting mode has been started up (YES in step S121), images are read from the memory 120 built into the digital camera 2 (step S122), and the read images are displayed as indexed images on the display unit 17 (step S123).

The processing judges whether an image has been selected from the images displayed as indexed images (step S124).

When no image has been selected, step S124 is repeated.

When an image has been selected, the selected image (nth image where n is an integer) is displayed on the display unit 17 (step S125). The image displayed on the display unit 17 can be viewed by the user through the touch panel 18 provided on a front surface of the display unit 17.

A request is made for input of a position at which the image (switch image) for use as the release button is displayed by displaying a message such as "Please input a position" (step S126).

Input to the touch panel 18 is performed (step S127), and detection blocks of the touch panel 18 at which the input occurred are detected (step S128). The input is performed using a pen, a finger, or the like to make contact with the detection blocks.

Coordinates of the detection blocks at which the input has been detected are calculated. Then, based on the above-described Equation 2, the coordinates of the detection blocks of the touch panel 18 are converted to coordinates of the pixels of the display unit 17 (step S129).

The region including the pixels of the coordinates resulting from the conversion is extracted using a region growing method or the like (step S130). The switch image is detected by extracting a substantially closed region, such as a circle, an ellipse or a rectangle, including the inputted locations, which is to say the image region desired for use as the operations device (the release button in this case). Note that extraction of the region is not limited to being performed using the region growing method, and another well-known image analyzing technique may be used.

When the region has extracted, identification of three-dimensional forms such as raised and lower portions is performed for the extracted region (step S131). The extracted region is divided into a plurality of blocks and a distance distribution for the extracted region is found by measuring distances in each block using the distance measurement control device 140 or the like. The three-dimensional form of the extracted region is detected based on the calculated distance distribution.

When the image desired for use as the release button and the corresponding three-dimensional form have been detected, an image in which regions outside the detected region have been masked is displayed on display unit 17 as shown in FIG. 11 (step S132). A request for confirmation as to whether region desired for use as the release button has been correctly inputted is made by displaying a message such as "Is this the image you wish to use?" together with YES/NO option buttons and judging whether an input has been made to the detection blocks of the touch panel 18 which correspond to the pixels displaying the "YES" button (step S133).

The processing then judges whether the input result for the confirmation is "YES" (step S134). When the input result of the confirmation is "NO", which is to say when the image displayed in step S132 is not the image desired for use as the release button (NO in step S134), the processing returns to step S125, and steps S125 to S134 are repeated.

When the input result of the check is "YES", which is to say when image displayed in step S132 is the image desired for use as the release button (YES in step S134), the image displayed on the display unit 17 (switch image) and the three-dimensional switch are stored in the memory 120 (step S135).

By this procedure, the release button image, location and size are set and stored in the memory 120.

The above completes the processing for recording images for use in the various operation portions.

Note that although the indexed images are displayed and the image to be recorded is selected from among the indexed images in steps S123 and S124, the images stored in the memory 120 may be read and displayed sequentially (played back one at a time) and the image to be recorded selected from the sequence.

Further, the three-dimensional form of the switch can be recognized using other well-known image analyzing techniques as well as the above-described method. For instance, the three-dimensional form of the switch may be recognized by calculating dimensions of the switch included in the captured image based on imaging conditions at image capture such as angle of view, focal distance and subject distance. In this case it is possible to calculate solid-body dimensions such as the height of the switch by using an image of the operation portion captured from an angle of view of substantially 45°, by using images of the operations device captured from above and the side respectively, or other such methods.

Other well-known methods which can be applied include a method by which raised and lowered portions on the subject are detected from shadows on an image generated by light shone on the subject from a predetermined light source (such as a flash) and the form is recognized from the raised and lower portion, a method by which a plurality of candidate surfaces are acquired from deformation in the texture and the form of the subject is recognized from the relationships between the candidate surfaces, and a method by which the form of the subject is recognized by measuring a spectral reflectance resulting from light shone towards the subject from a predetermined light source. Alternatively, the subject may be imaged from differing angles and the distances measured by making use of the captured plural images. Alternatively, a ranging image of the subject may be captured using an image taking apparatus or the like not shown in the drawings and the ranging image used to calculate the distance distribution of the subject.

<Operations Device Recording Processing>

Processing for recording an image recorded using the processing shown in FIG. 10 is described with reference to FIG. 12.

The following processing is mainly performed by the operation image generation device 139.

The playback mode is set using the mode switch (step S140). Thereafter, the processing judges whether a switch arrangement mode has been started up using the mode dial (step S141). When the switch arrangement mode has not been started up (NO in step S141), step S141 is repeated.

When the switch arrangement mode has been started up (YES in step S141), a switch image and region data stored in the memory 120 in step S135 are read (step S142), and a selection screen of the type shown in FIG. 13 is displayed (step S143). In FIG. 13, the image stored in step S135 has been assigned as a recorded image 1.

The processing judges whether a desired switch image has been selected on the selection screen of the type shown in FIG. 13 (step S144). When the desired switch image has not been selected (NO in step S144), step S144 is repeated.

When a desired switch image has been selected (YES in step S144), the selected switch image, position and size information, and outline information are read from the memory 120 and the switch image is displayed on the operation displaying LCD 150 based on the read information (step S145). In other words, when the recorded image 1 has been selected as the switch image on the "release button recording" selection screen shown in FIG. 13, the recorded image 1 is displayed at a predetermined location (here, the location at which the release button is disposed on a normal digital camera or the like) on the operation displaying LCD 150 as shown in FIG. 14.

Figure 28:
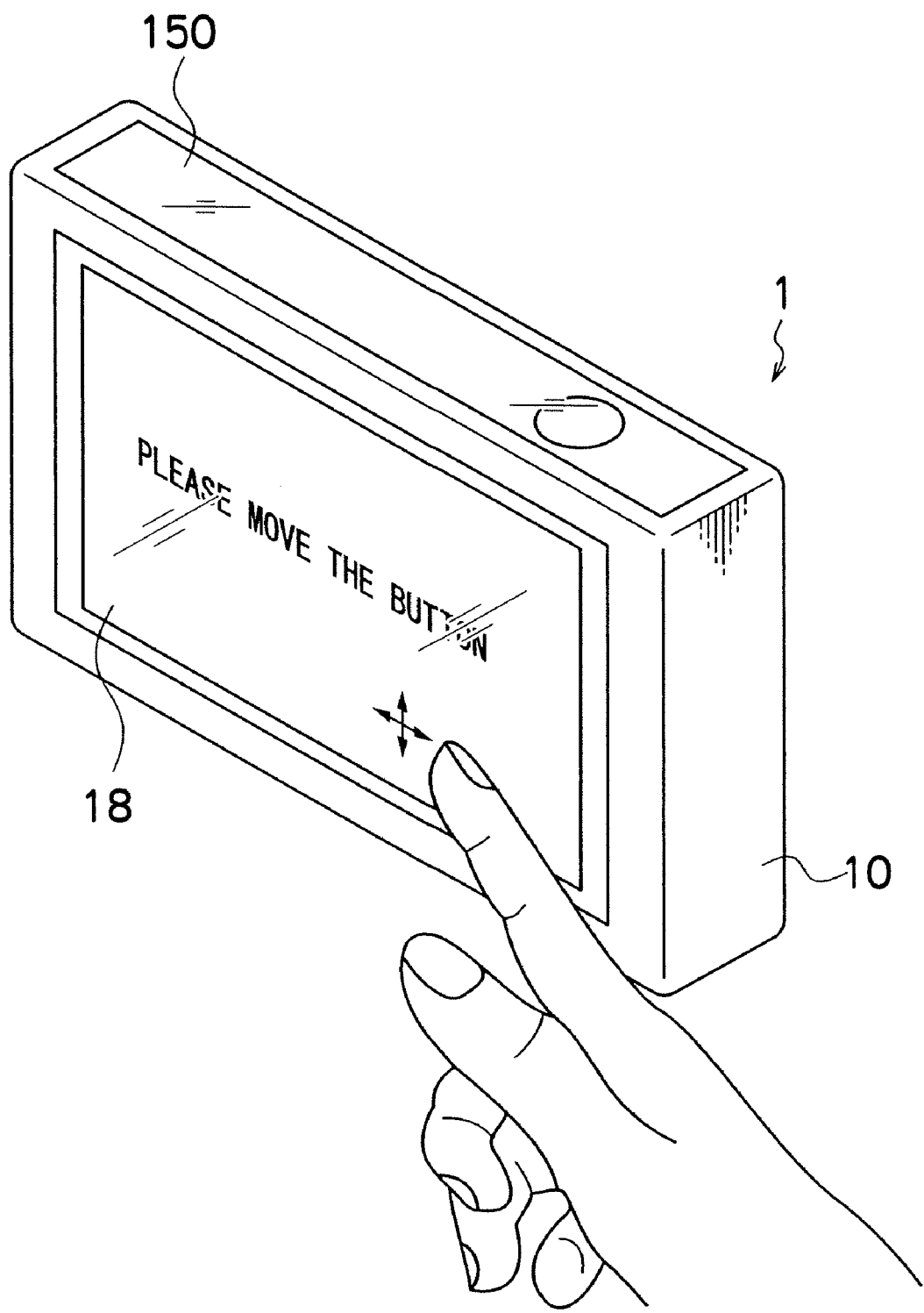
FIG. 28 illustrates an input of button position in the operations device recording processing.

With the desired switch image being displayed on the operation displaying LCD 150, a request for input of a button position is made by displaying a message such as "Please move the button" on the display unit 17 (step S146), and input of the button position is performed (step S147). For instance, the input of the button may be performed by displaying arrows on the display unit 17 as shown in FIG. 28, the user moving a finger or the like in the directions of the arrows, and the movement of the finger or the like being detected by the touch panel 16, thereby causing the recorded image 1 to move to the location desired for the release button.

The processing judges whether the input of the button position has been completed (step S148). When the input of the button position has not been completed (NO in step S148), the processing returns to step S146, and steps S146 to S148 are repeated.

Figure 29:
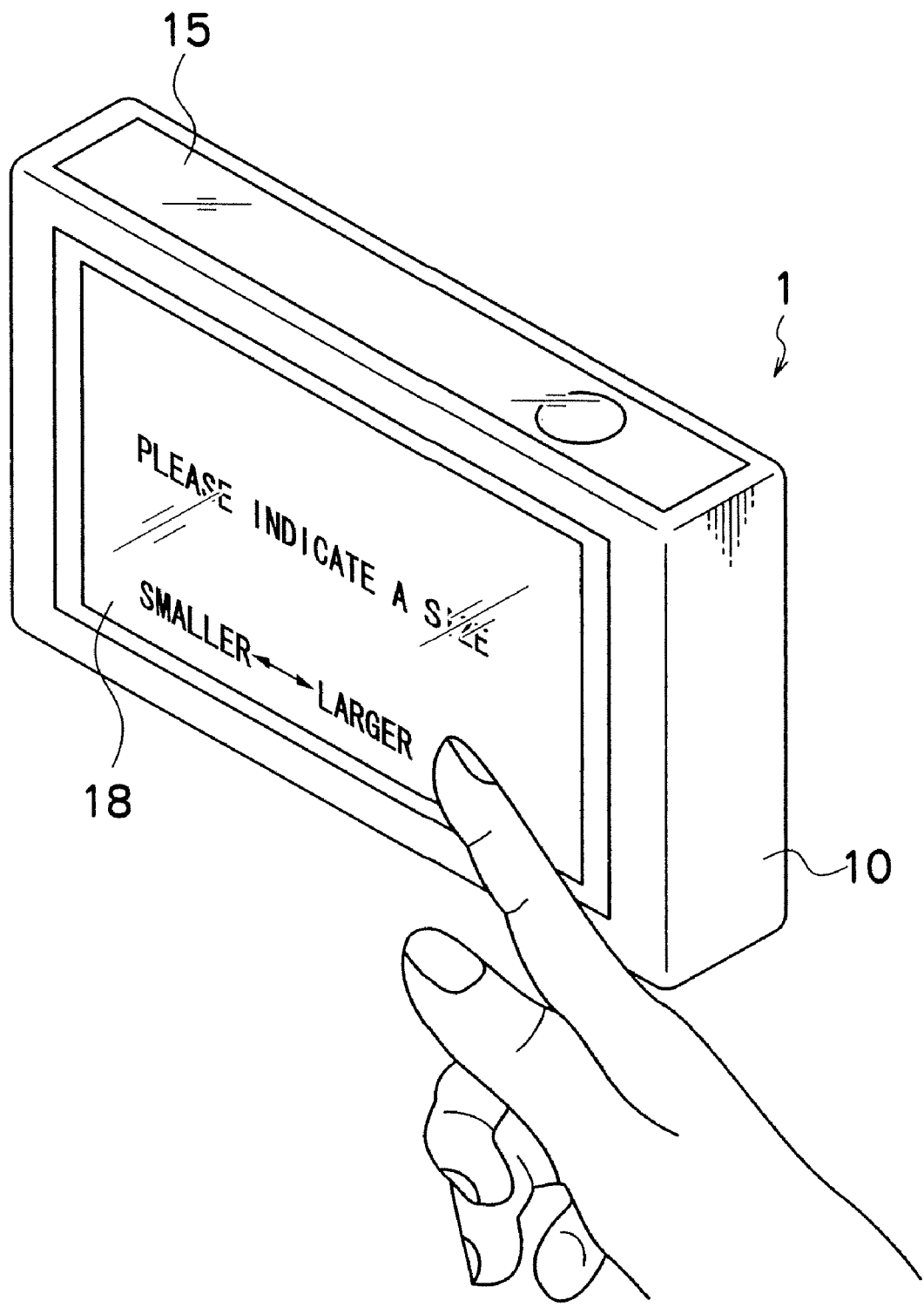
FIG. 29 illustrates an input of button size in the operations device recording processing.

When the input of the button position has been completed (YES in step S148), a request to specify a size of the button is made by displaying a message such as "Please indicate a size of the button" on the display unit 17 (step S149), and input of button size is performed (step S150). For instance, the change in the size of the recorded image 1 may be performed by the display unit 17 displaying arrows as shown in FIG. 29, the user moving a finger or the like in the directions of the arrows, and the movement of the finger or the like being detected by the touch panel 16.

The processing judges whether input of the button size has been completed (step S151). When the input of the button size has not been completed (NO in step S151), the processing returns to step S149, and steps S149 to S151 are repeated.

When the input of the button size has been completed (YES in step S151), the processing judges whether an input indicating that a release button of a desired image, size, position and the like is being displayed on the operation displaying LCD 150 has been made (step S152). For instance, this judgment may performed by displaying a message such as "Is this satisfactory?" together with YES/NO option buttons on the display unit 17 as shown in FIG. 16, and judging whether an input is made to the detection blocks of the touch panel 18 which correspond to the pixels displaying the "YES" button.

When a release button of the desired image, size, position and the like is not displayed on the operation displaying LCD 150 (NO in step S152), the processing returns to step S145, and steps S145 to S152 are performed.

When a release button of the desired image, size, position and the like is displayed on the operation displaying LCD 150 (YES in step S152), data made up of the image, position, and size of the release button displayed on the operation displaying LCD 150 is stored in the memory 120 (step S153).

This procedure completes the recording of the desired release button. Thereafter, the release button is displayed on the operation displaying LCD 150 and the three-dimensional display device 160.

Figure 30:
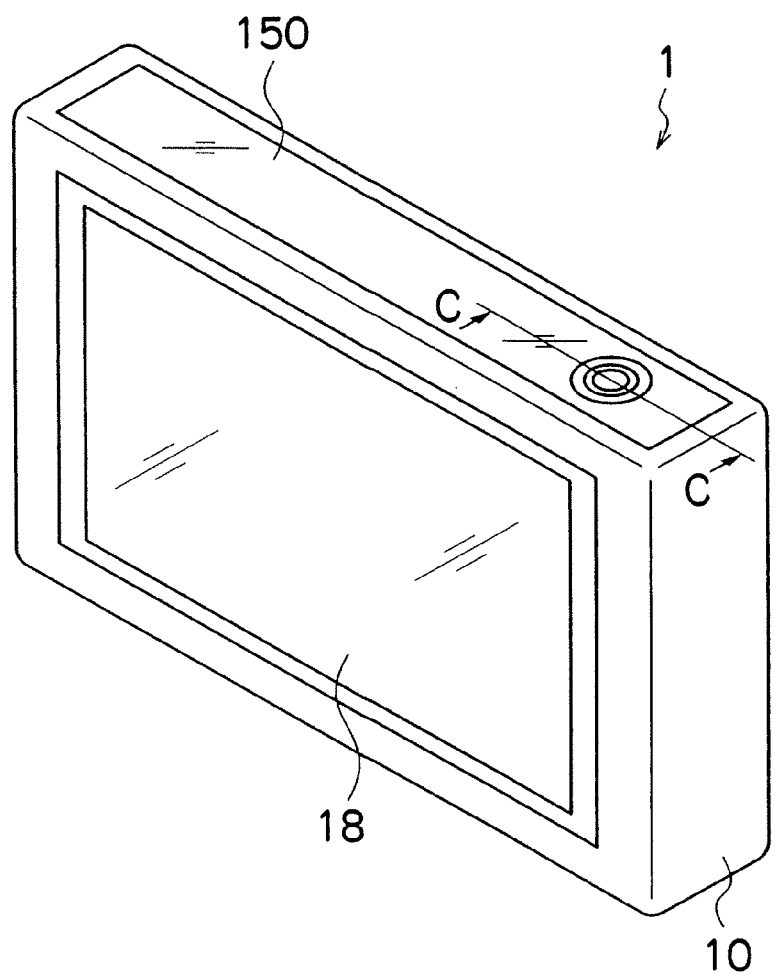
FIG. 30 is an example of a display of a recorded release button.
Figure 31:
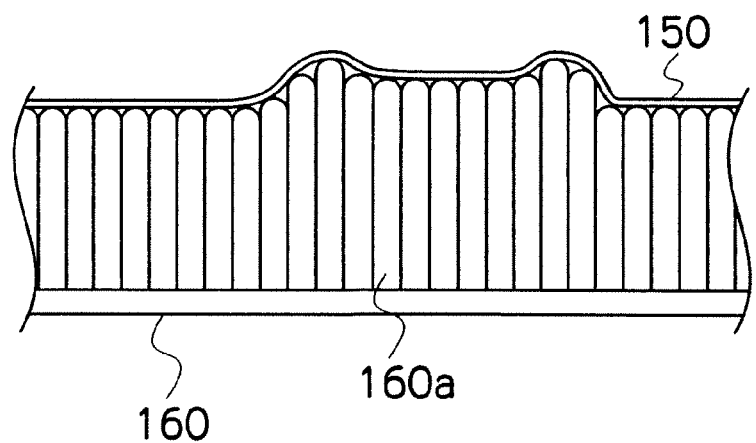
FIG. 31 is an example of a display of a recorded release button.

FIG. 30 and FIG. 31 show the manner in which the release button is displayed. FIG. 30 is a rear perspective view of the digital camera 2 on which a customized release button is displayed, and FIG. 31 is a cross-sectional view through C-C in FIG. 30. The operation displaying LCD 15 provided on the upper surface of the three-dimensional display device 160 is pushed upwards by the three-dimensional display elements 160a, raising the profile of the release button and the surrounding regions higher than other portions. Also, since the circumferential portion of the release button is raised even higher, the position of the release button can be found simply by touching with a finger or the like. Since it is then possible to perform operations without looking at the operations device, an improvement in operability can be achieved.

Figure 32:
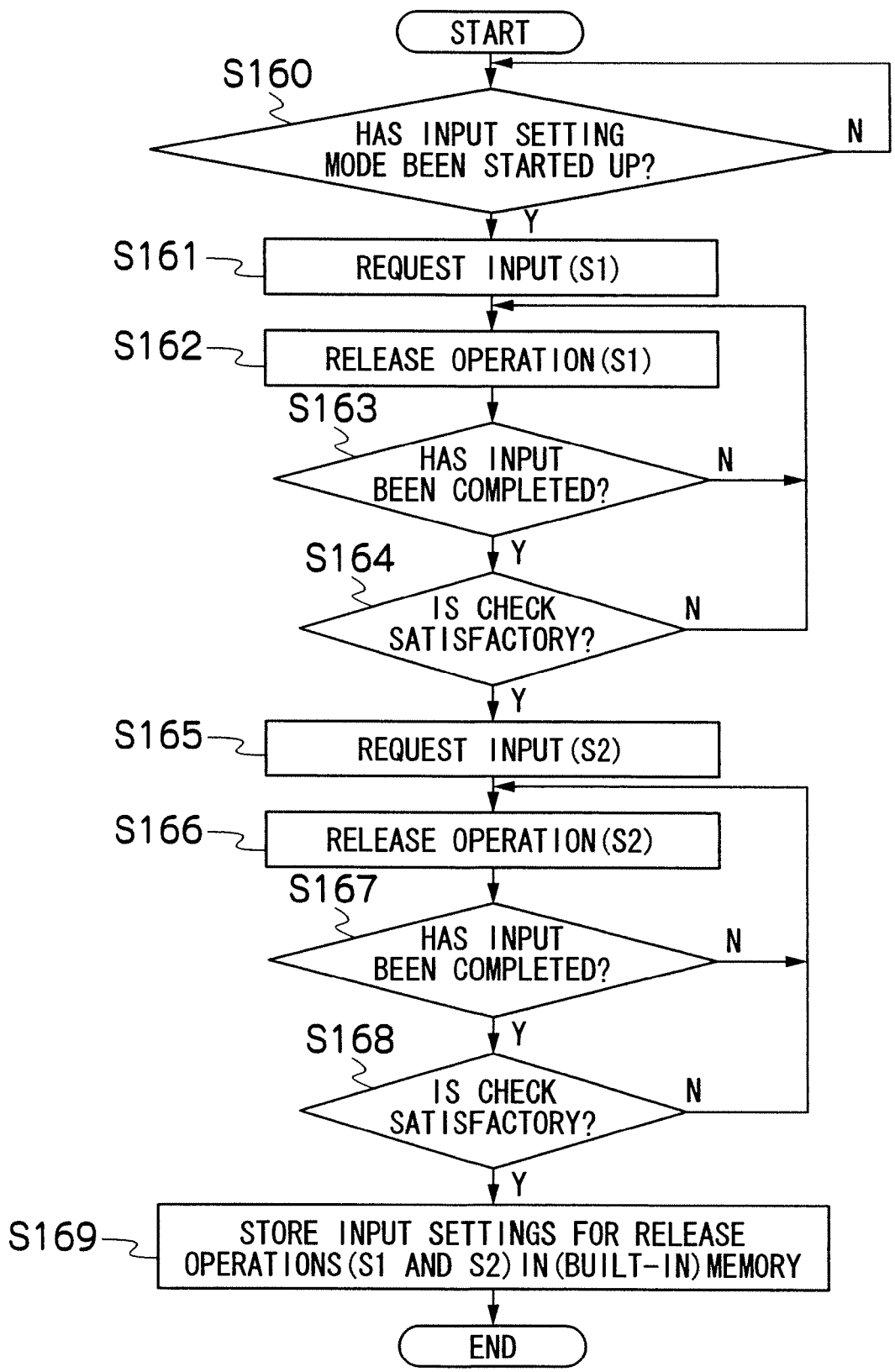
FIG. 32 is a flowchart showing a flow of processing to set a feel of operations on the release button.

To make use of the release button recorded in the above-described manner, it is necessary to perform input setting for the three-dimensional display device 160 based on the image of the release button. As described above, the single release button must be set for the plurality of operations, S1 and S2. The following describes the setting of the input settings so that S1 is performed when a weak pressing input has occurred and S2 is performed when a strong pressing input has occurred, with reference to FIG. 32.

The processing judges whether the input settings mode has been started up using the mode dial (step S160). When the input settings mode has not been started up (NO in step S160), step S160 is repeated.

Figure 33:
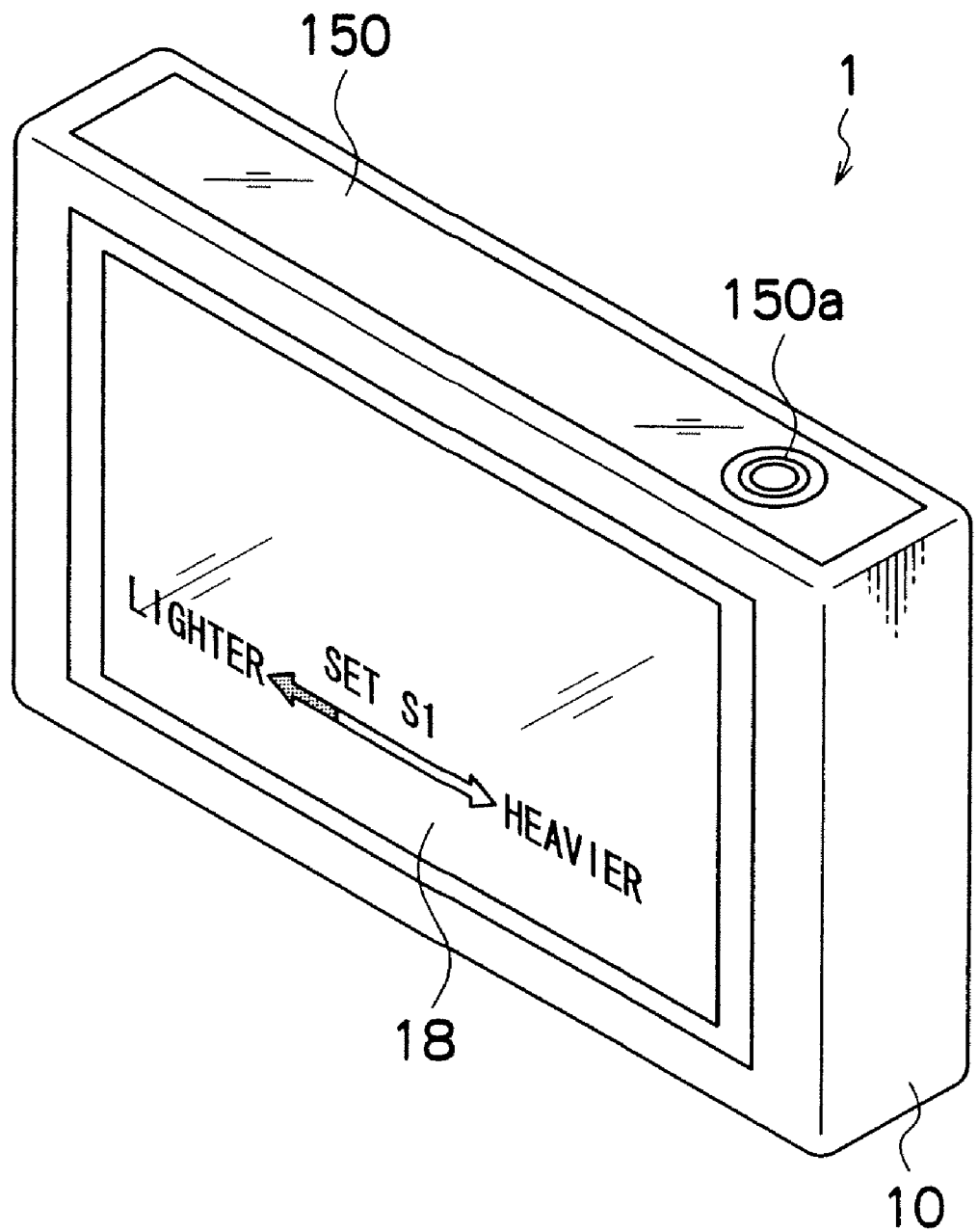
FIG. 33 is an example of a setting screen for setting the feel of operations on the release button.

When the input settings mode has been started up (YES in step S160), a request is made for the input operation for S1 by displaying a message such as "Please perform the input operation for S1" (step S161), and the input operation for S1 is performed (step S162). For instance, arrows may be displayed on the display unit 17 as shown in FIG. 33, and the user performing the S1 operation may cause the force of the S1 operation to be indicated within the arrows, as shown in FIG. 33.

The processing judges whether the input operation for S1 has been completed (step S163). When the input operation for S1 has not been completed (NO in step S163), the processing returns to step S162, and steps S162 to S163 are repeated.

When the input operation for S1 has been completed (YES in step S163), the processing judges whether an operation feeling of the input operation for S1 is acceptable (step S164). For instance, this judgment may performed by displaying a message such as "Is this satisfactory?" together with YES/NO option buttons on the display unit 17 as shown in FIG. 16, and judging whether an input is made to the detection blocks of the touch panel 18 which correspond to the pixels displaying the "YES" button.

When the input result of the check is "NO", which is to say when the operation feeling of the input operation for S1 is not acceptable (NO in step S164), the processing returns to step S162, and steps S162 to S164 are repeated.

Figure 34:
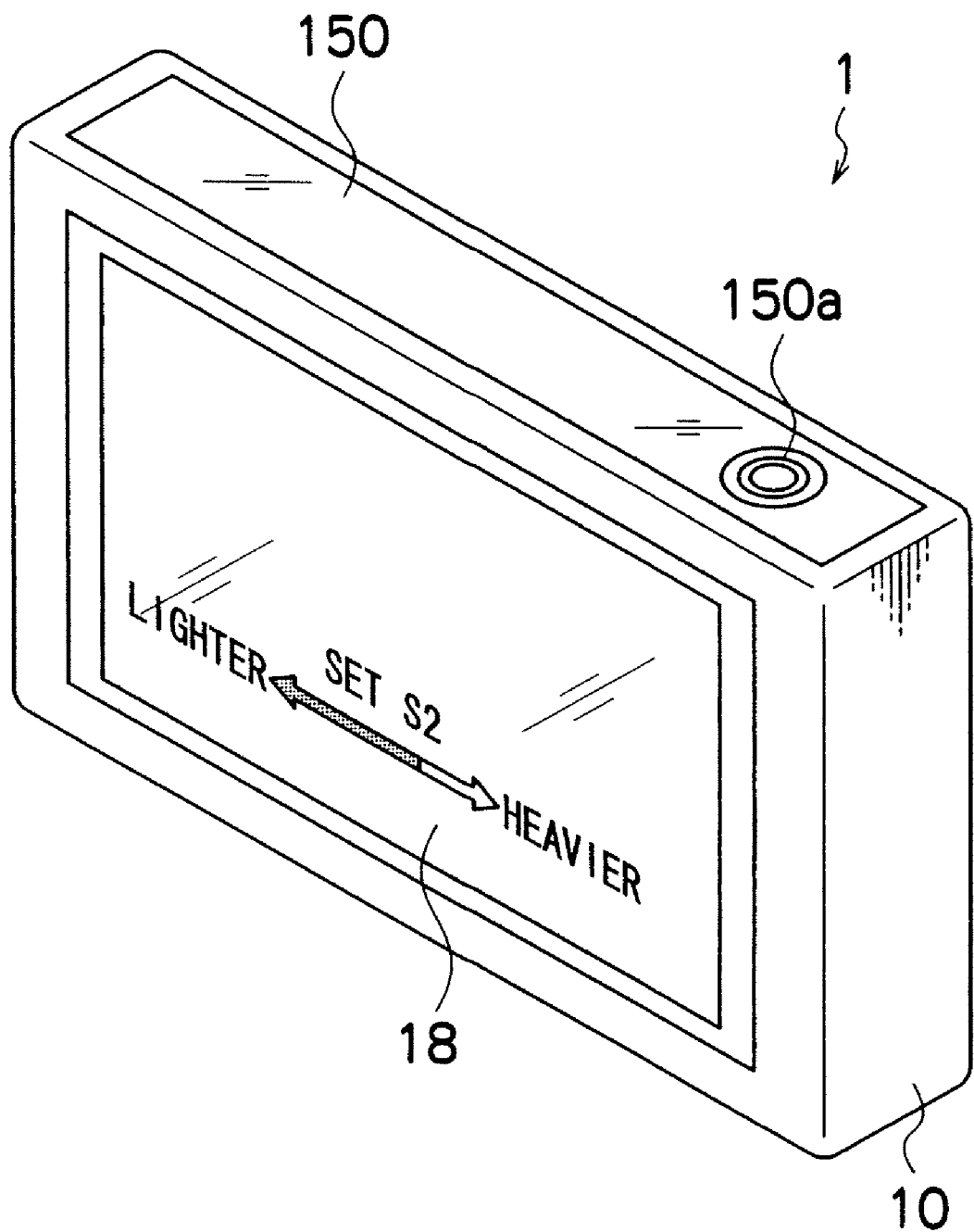
FIG. 34 is an example of a setting screen for setting the feel of operations on the release button.

When the input result of the check is "YES", which is to say when the operation feeling of the input operation for S1 is acceptable (YES in step S164), a request for the input operation for S2 is made by displaying a message such as "Please perform the input operation for S2" on the display unit 17, and the input operation for S2 is performed (step S166). For instance, arrows may be displayed on the display unit 17, and the user performing the S2 operation may cause the force of the S2 operation to be indicated within the arrows, as shown in FIG. 34.

The processing judges whether the input of the input operation for S2 has been completed (step S167). When the input operation for S2 has not been completed (NO in step S167), the processing returns to step S166, and steps S166 to S167 are repeated.

When the input operation for S2 has been completed (YES in step S167), the processing judges whether an operation feeling of the input operation for S2 is acceptable in same way as in step S164 (step S168).

When the input result of the check is "NO", which is to say when the operation feeling of the input operation for S2 is not acceptable (NO in step S168), the processing returns to step S166, and steps S166 to S168 are repeated.

When the input result of the check is "YES", which is to say when the operation feeling of the input operation for S2 is acceptable (YES in step S168), the input setting for S1 checked in step S164 and the input setting for S2 checked in step S168 are stored in the memory 120 (step S169).

Hence, when the user uses a finger to press the region of the three-dimensional display device 160 at which the release button is displayed and an input with one of the forces stored in step S169 is detected, one of the release operations (S1 or S2) is executed. Since the operation feelings for S1 and S2 of the recorded release button can be set separately in this way, the operations feeling can be set more precisely.

According to the present embodiment, it is possible to make use of digital camera-captured images of various switches and operations members not only to reproduce the appearance and shape of these switches and members in the operations device designs, but also to reproduce three-dimensional forms such as raised and lowered portions. Further, it is possible to freely customize the position and shape of the operations device or the like to match the length and width of the user's fingers.

According to the present embodiment, it is possible to freely change the detection range and position of the operation portion and like rather than just the appearance of the operation portion. Thus, capturing an image of all the operation portion of, for instance, a habitually used silver halide camera, and realizing, in an unaltered form, the functions, appearance, and position of these operation portions in the digital camera makes it possible to realize an operability that is similar to the operability of the habitually used silver-halide camera.

According to the present embodiment, it is possible to customize an operation portion of the digital camera to a given design, by designing switches and the like with a desired form on paper and capturing an image of the design.

Since, according to the present invention, a desired switch image and three-dimensional form of the switch are recorded in the built-in memory of the device, the recorded data is not lost when the removable memory is changed, and the recorded an operation portion and the like can be freely altered.

According to the present invention, the image displayed on the three-dimensional display device can be used as the desired switch by detecting the strength (magnitude, stroke, distribution, and range) of the pressing force applied to the three-dimensional display elements and causing the desired operation. Moreover, it is possible to reproduce the feel of switch operations in actual cameras by setting differing operations according to the strength of the pressing force applied to the three-dimensional display elements, and therefore to provide users who place a high value on operability with a hitherto unavailable camera having an operability that can be freely set.

Note that although in the present embodiment the user indicates given points and extracts, as the switch image, a substantially closed region which includes the indicated points, the switch image may be extracted automatically. Since image capture is normally performed in such a way that the desired image falls in a substantially central location, a substantially closed region located in a central vicinity of the image may be extracted as the desired region. Alternatively, all substantially closed regions captured in the image may be extracted and the user may be allowed to select the desired image from among the extracted plurality of substantially closed regions. Hence, it is possible to extract the desired region in a simpler manner. Alternatively, the desired region may be extracted by the user inputting the desired region by hand. In this case, when the user performs an input to the touch panel when the image is being displayed on the display unit, the input is detected and the position at which the input has been detected is displayed in coordinates. The coordinates for the detected input position may be converted to display device pixel coordinates using Equation 1 or Equation 2, and the desired region extracted based on the pixel coordinates resulting from the conversion.

Although in the present embodiment the release button is displayed on a three-dimensional display device provided on the upper surface of the camera body, another three-dimensional display device may be provided on the rear surface of the display unit on the rear surface of the camera body so that it is possible to select the three-dimensional display device that is to display the release button. Note that the three-dimensional display device can be provided on any surface other than the front surface on which a lens and the like are provided, and the number of three-dimensional display devices provided can be freely set. Further, providing a three-dimensional display device on the rear surface makes it possible to finely control the feel of operations by, for instance, setting two stages in the operation strengths of the zoom button to change the zooming speed.

Although in the present embodiment the requests are made by displaying text, the requests may be made using audio or the like. Moreover the messages may be displayed on the operation displaying LCD rather than the display unit.

Although in the present embodiment the flexible liquid crystal display is provided on the front surface of the three-dimensional display device, the flexible liquid crystal display may, when display of characters, images and the like is unnecessary, be omitted from the construction. Since the operation portions are expressed as raised and lowered portions by the three-dimensional display device in the manner described above, the operations can be performed without displaying images.

Figure 35:
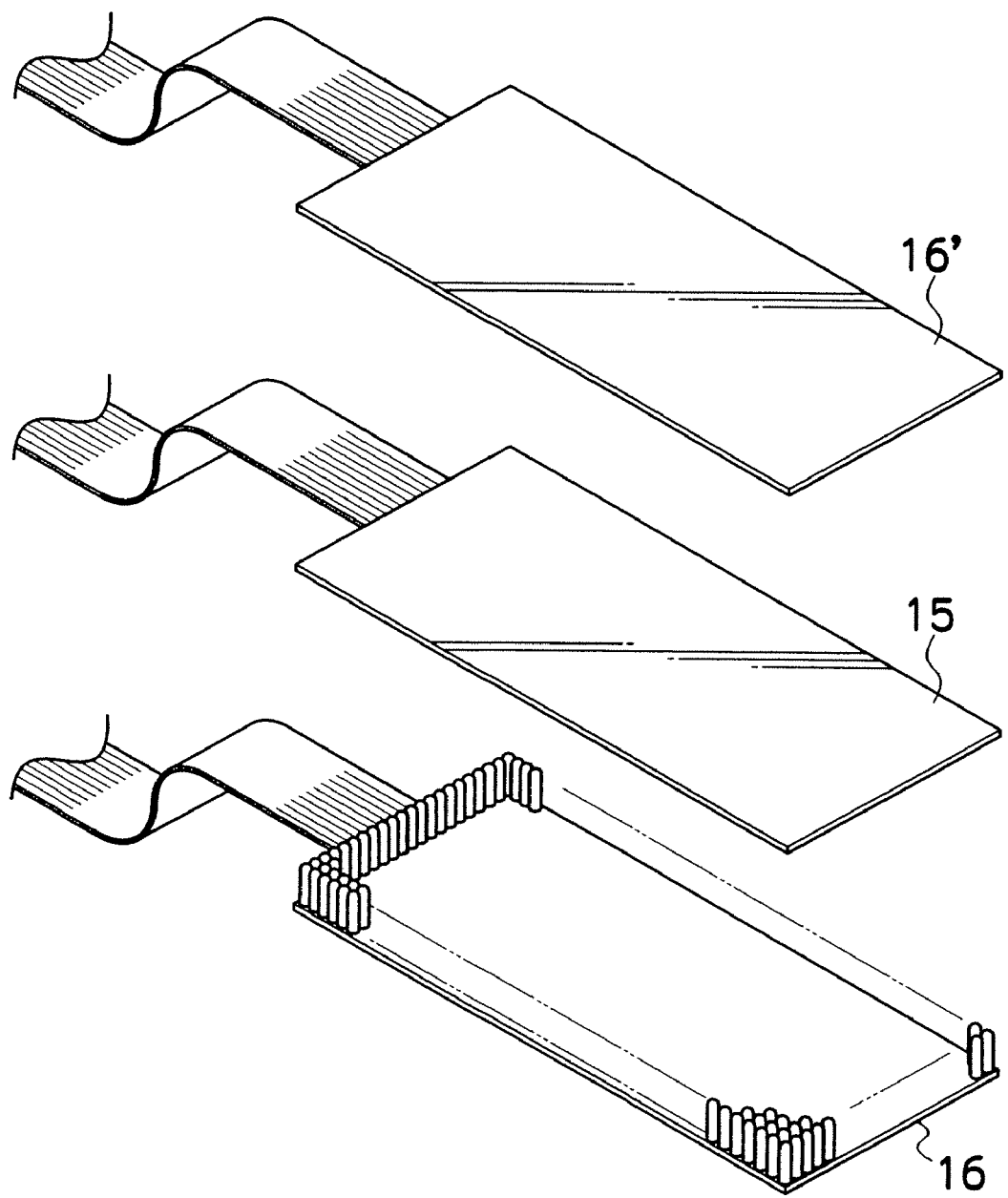
FIG. 35 is an example showing the touch panel provided on the front surface of the operation displaying LCD.

In the present embodiment, the desired operation is performed by detecting the size, stroke, distribution, range and the like of the external force applied to the three-dimensional display elements. However, a touch panel 16' may be provided in front of the operation displaying LCD 150, and the touch panel 16' may be used as the detection device as shown in FIG. 35.

Figure 36:
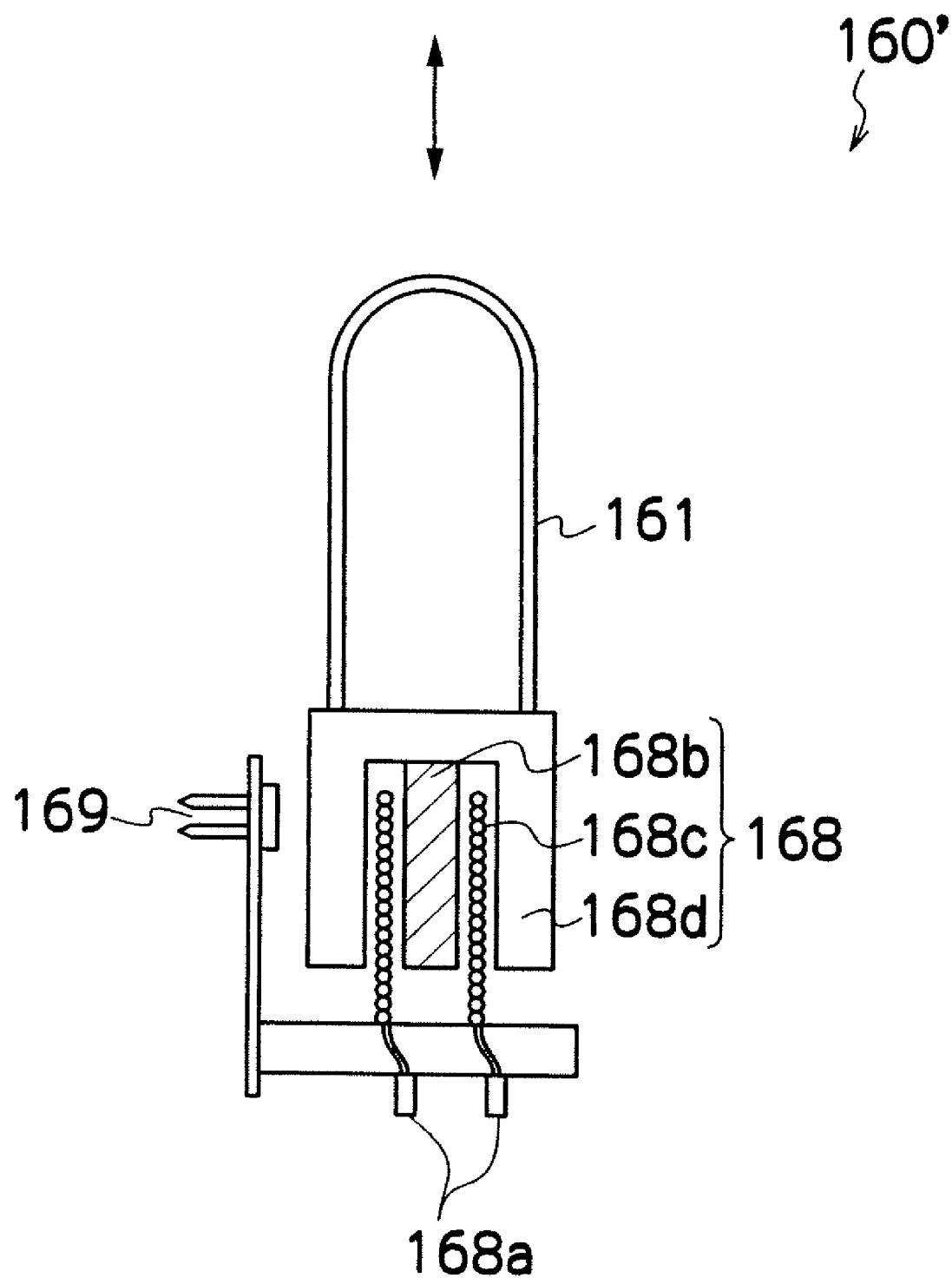
FIG. 36 shows another construction of the three-dimensional display elements of the digital camera 2.

In the present embodiment, the stacked-type piezoelectric actuator 162 is used as the actuator for driving the rods 161. However, the actuator is not limited to this type, and another actuator capable of driving the rods 161 in the longitudinal direction may be used. For instance, it is possible to use a voice coil motor 168 as shown in FIG. 36. The voice coil motor is mainly constructed from electrodes 168*a*, a magnet 168*b*, a coil 168*c*, and a yoke 168*d*. When a voltage is applied to the coil 168*c* via the electrodes 168*a*, straight-line motion (in the direction of the arrows in FIG. 36) of the coil 168*c* in the magnetic field of the magnet 168*b* causes the rods 161 to move vertically. The height of the rods 161 is adjusted by position detection elements 169 such as hole elements provided separately to the voice coil motor 168. When the ends of rods 161 are pressed from an external position, the pressing down of the rods 161 by the position detection elements 169 is detected. Thus, it is possible to use the three-dimensional display elements 160*a* as switches. When the three-dimensional display elements 160*a* are used as switches, the pressing down of the rods 161 may be detected by detecting a back electromotive force generated in the coils 168*c* rather than detecting the pressing down of the rods 161 using the position detection elements 169.

In the present embodiment, all the three dimensional display elements which make up the three-dimensional display device are controlled by providing a single decoder, piezoelectric actuator driving circuit, electromotive force detection circuit, and encoder, and performing processing on each of the three-dimensional display elements in turn. However, each three-dimensional display element may be provided with a separate decoder, piezoelectric activator driving circuit, electromotive force detection circuit, and encoder.

What is claimed is:

1. An electronic device, comprising:
   a three-dimensional display device comprising a two-dimensionally arranged plurality of three-dimensional display elements each including a rod and an actuator which causes the rod to move vertically;
   a storage device which has a three-dimensional form of a desired switch stored therein;
   a three-dimensional display control device which separately controls heights of the rods via the actuators of the plurality of three-dimensional display elements based on the three-dimensional form of the switch stored in the storage device and deforms an upper surface of the three-dimensional display device to match the three-dimensional form of the switch;
   an image capture device which acquires an image of a subject;
   an extraction device which extracts a switch image that is included in the acquired image; and
   a form detection device which detects a three-dimensional form of a switch based on the switch image extracted by the extraction device,
   wherein the storage device stores the three-dimensional form of the switch detected by the form detection device as the three-dimensional form of the desired switch.

2. The electronic device according to claim 1, wherein the storage device includes:
   a first recording device having recorded therein a three-dimensional form of a switch for use in initial setting; and
   a second recording device having recorded therein the three-dimensional form of the switch detected by the form detection device, and
   wherein the three-dimensional display control device:
   when the three-dimensional form of the switch has been recorded in the second recording device, deforms the upper surface of the three-dimensional display device to match the three-dimensional form of the switch recorded in the second recording device; and
   when the three-dimensional form of the switch has not been recorded in the second recording device, deforms the upper surface of the three-dimensional display device to match the three-dimensional form of the switch stored in the first recording device.

3. The electronic device according to claim 1, wherein the form detection device detects the three-dimensional form of the switch based on the extracted switch image.

4. The electronic device according to claim 1, wherein the form detection device divides the extracted switch image to form a plurality of regions, measures a distance to the switch for each of the plurality regions, and detects the three-dimensional form of the switch based on the measured distances.

5. The electronic device according to claim 1, further comprising:

an operation setting device which sets an operation to be executed by the control device for the pressing force detected by the pressing force detection device, wherein the pressing force detection device detects a plurality of pressing forces of differing strengths to the three-dimensional display elements, and the operation setting device sets a different operation for each of the plurality of pressing forces of differing strengths.

6. The electronic device according to claim 2, wherein the form detection device detects the three-dimensional form of the switch based on the extracted switch image.

7. The electronic device according to claim 2, wherein the form detection device divides the extracted switch image to form a plurality of regions, measures a distance to the switch for each of the plurality regions, and detects the three-dimensional form of the switch based on the measured distances.

8. The electronic device according to claim 6, further comprising:

a flexible display device which is provided on the upper surface of the three-dimensional display device and deforms to match a form of the upper surface of the three-dimensional display device;

a storage device having stored therein a switch image of a desired switch; and a display control device which causes the flexible display device to display the switch image stored in the storage device, wherein the display control device causes the flexible display device to display the switch image so as to overlay the three-dimensional form of the switch displayed on the three-dimensional display device.

9. The electronic device according to claim 7, further comprising:

a flexible display device which is provided on the upper surface of the three-dimensional display device and deforms to match a form of the upper surface of the three-dimensional display device;

a storage device having stored therein a switch image of a desired switch; and a display control device which causes the flexible display device to display the switch image stored in the storage device, wherein the display control device causes the flexible display device to display the switch image so as to overlay the three-dimensional form of the switch displayed on the three-dimensional display device.

10. The electronic device according to claim 8, further comprising:

a pressing force detection device which detects pressing forces to the three-dimensional display device, the detection device detecting the pressing force to the three-dimensional display elements provided in a region at which the switch is displayed by the three-dimensional display control device; and a control device which, when a pressing force is detected by the pressing force detection device, executes a predetermined operation that has been set in advance for the switch.

11. The electronic device according to claim 9, further comprising:

a pressing force detection device which detects pressing forces to the three-dimensional display device, the detection device detecting the pressing force to the three-dimensional display elements provided in a region at which the switch is displayed by the three-dimensional display control device; and a control device which, when a pressing force is detected by the pressing force detection device, executes a predetermined operation that has been set in advance for the switch.

12. The electronic device according to claim 10, further comprising:

an operation setting device which sets an operation to be executed by the control device for the pressing force detected by the pressing force detection device, wherein the pressing force detection device detects a plurality of pressing forces of differing strengths to the three-dimensional display elements, and wherein the operation setting device sets a different operation for each of the plurality of pressing forces of differing strengths.

13. The electronic device according to claim 11, further comprising:

an operation setting device which sets an operation to be executed by the control device for the pressing force detected by the pressing force detection device, wherein the pressing force detection device detects a plurality of pressing forces of differing strengths to the three-dimensional display elements, and wherein the operation setting device sets a different operation for each of the plurality of pressing forces of differing strengths.

14. The electronic device according to claim 8, further comprising:

a touch panel of a substantially same form as the three-dimensional display device provided on the upper surface of the three-dimensional display device or the flexible display device;

an input detection device which detects an input to the touch panel, the detection device detecting an input to a region overlaying a region at which the switch is displayed by the three-dimensional display control device; and a control device which, when an input is detected by the input detection device, executes a predetermined operation that has been set in advance for the switch.

15. The electronic device according to claim 9, further comprising:

a touch panel of a substantially same form as the three-dimensional display device provided on the upper surface of the three-dimensional display device or the flexible display device;

an input detection device which detects an input to the touch panel, the detection device detecting an input to a region overlaying a region at which the switch is displayed by the three-dimensional display control device; and a control device which, when an input is detected by the input detection device, executes a predetermined operation that has been set in advance for the switch.

16. The electronic device according to claim 12, wherein the storage device is built into a device body and stores information of at least one of a position, a size, and a display region of the switch displayed on the three-dimensional display device by the three-dimensional display control device.

17. The electronic device according to claim 13, wherein the storage device is built into a device body and stores information of at least one of a position, a size, and a display region of the switch displayed on the three-dimensional display device by the three-dimensional display control device.

18. The electronic device according to claim 14, wherein the storage device is built into a device body and stores information of at least one of a position, a size, and a display region of the switch displayed on the three-dimensional display device by the three-dimensional display control device.

19. The electronic device according to claim 15, wherein the storage device is built into a device body and stores information of at least one of a position, a size, and a display region of the switch displayed on the three-dimensional display device by the three-dimensional display control device.

20. An electronic device, comprising:
- a three-dimensional display device comprising a two-dimensionally arranged plurality of three-dimensional display elements each including a rod and an actuator which causes the rod to move vertically;
- a storage device which has a three-dimensional form of a desired switch stored therein;
- a three-dimensional display control device which separately controls heights of the rods via the actuators of the plurality of three-dimensional display elements based on the three-dimensional form of the switch stored in the storage device and deforms an upper surface of the three-dimensional display device to match the three-dimensional form of the switch;
- a flexible display device which is provided on the upper surface of the three-dimensional display device and deforms to match a form of the upper surface of the three-dimensional display device;
- a storage device having stored therein a switch image of a desired switch; and
- a display control device which causes the flexible display device to display the switch image stored in the storage device,
- wherein the display control device causes the flexible display device to display the switch image so as to overlay the three-dimensional form of the switch displayed on the three-dimensional display device.

* * * * *